United States Patent [19]
Seo

[11] Patent Number: 5,835,629
[45] Date of Patent: Nov. 10, 1998

[54] CODE PATTERN-IMAGE PROCESSING APPARATUS

[75] Inventor: Minoru Seo, Hino, Japan

[73] Assignee: Olympus Optical Co., Ltd., Tokyo, Japan

[21] Appl. No.: 626,985

[22] Filed: Apr. 3, 1996

[30] Foreign Application Priority Data

Apr. 13, 1995 [JP] Japan ................................. 7-088280
Jun. 5, 1995 [JP] Japan ................................. 7-160145

[51] Int. Cl.$^6$ ..................................................... G06K 9/34
[52] U.S. Cl. ................................................ 382/173; 382/203
[58] Field of Search ................................... 382/190, 199, 382/202, 203, 245, 246, 173, 177, 175, 282; 235/469, 456, 454, 494; 358/453

[56] References Cited

U.S. PATENT DOCUMENTS

| | | | |
|---|---|---|---|
| 5,101,448 | 3/1992 | Kawachiya et al. | 382/287 |
| 5,129,012 | 7/1992 | Abe | 382/190 |
| 5,335,290 | 8/1994 | Cullen et al. | 382/176 |
| 5,555,556 | 9/1996 | Ozaki | 382/176 |
| 5,592,574 | 1/1997 | Chilton et al. | 382/295 |

*Primary Examiner*—Jon Chang
*Attorney, Agent, or Firm*—Frishauf, Holtz, Goodman, Langer & Chick

[57] ABSTRACT

A code-pattern processing apparatus wherein a streak processor extracts a binary data string as a streak constituting a part of a marker only when the run length in the raster direction of input binary image data is within a predetermined range. An adjacency determination unit and Xmin and Xmax comparators compare the streak with attribute data of the immediately preceding line supplied from an attribute data memory. An attribute data generator generates attribute data corresponding to the comparison result. This attribute data is newly written or overwritten on old data in the attribute data memory. If it is determined that there is no streak of a line of interest and attribute data of the immediately preceding line is present, a circumscribed quadrilateral extraction unit outputs the values of the attribute data of the immediately preceding line as the coordinate values of a circumscribed quadrilateral.

7 Claims, 22 Drawing Sheets

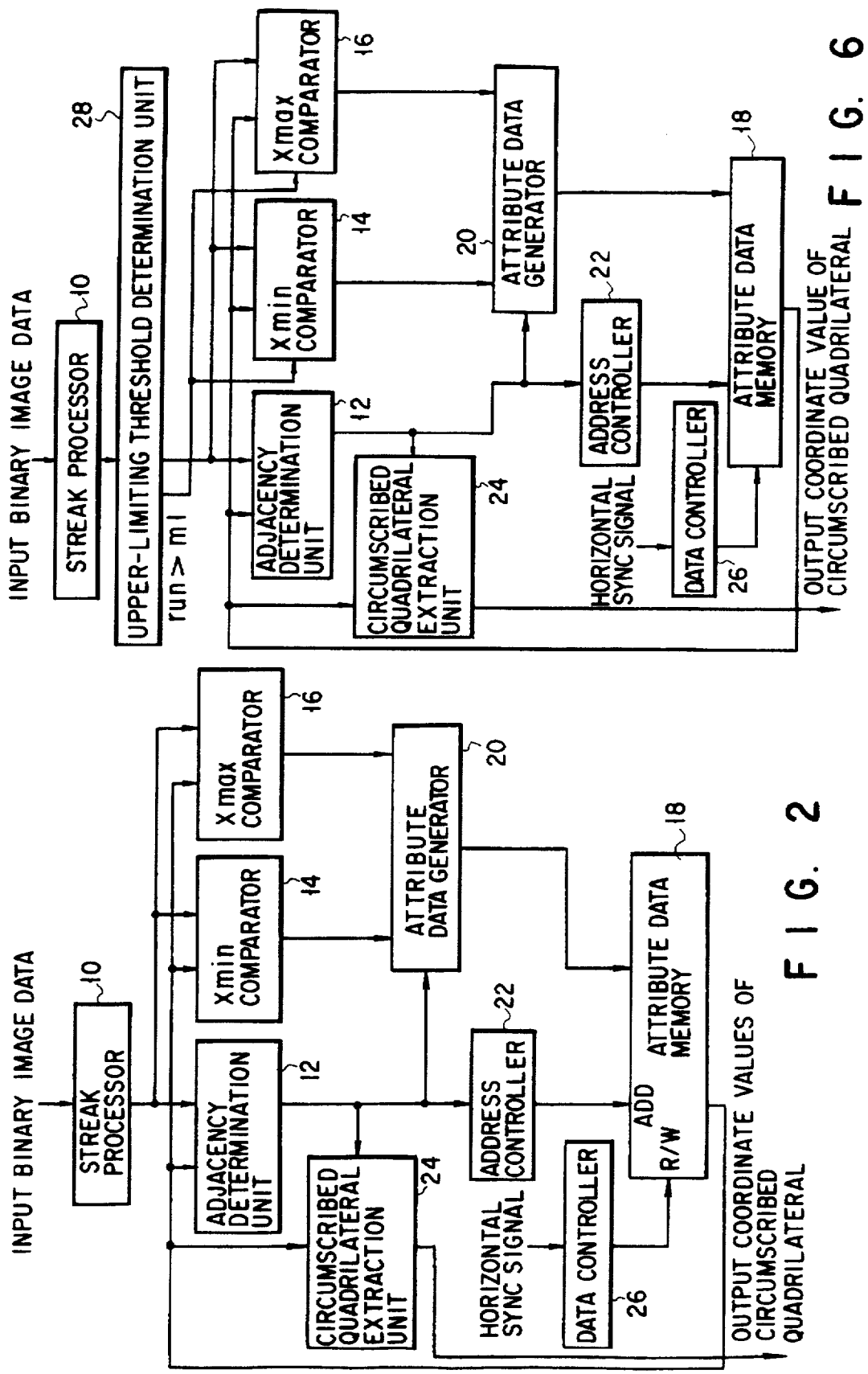

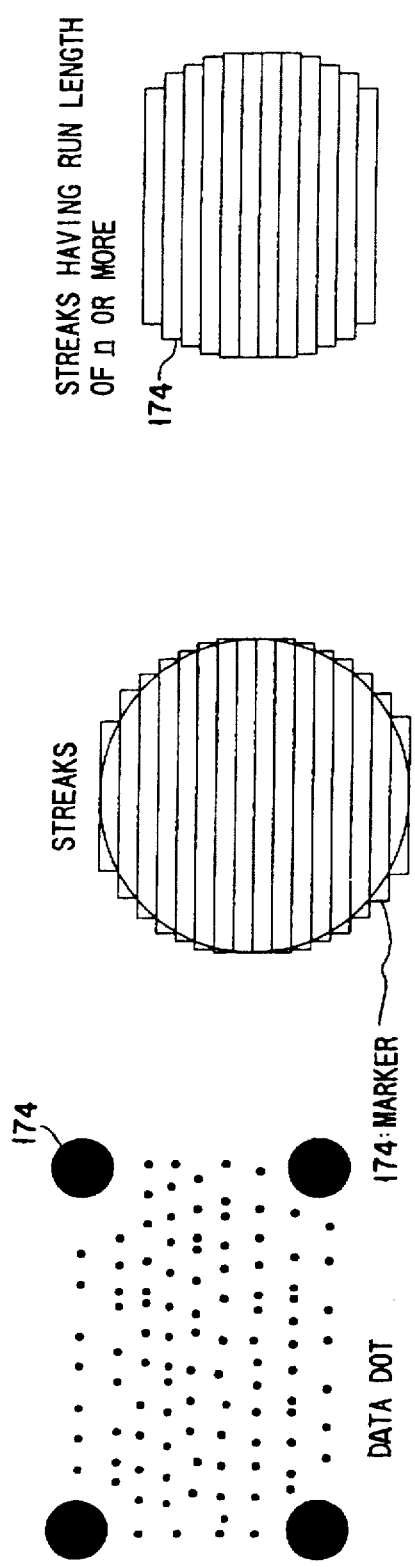
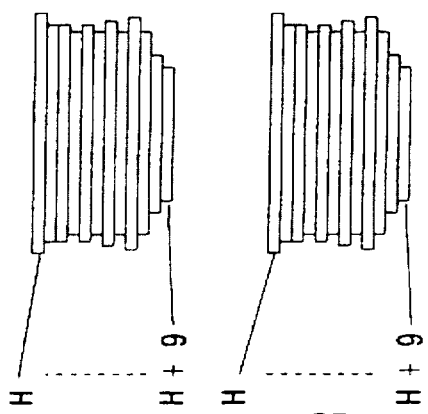
FIG. 3A
FIG. 3B
FIG. 3C
FIG. 4A
FIG. 4B
FIG. 4C
FIG. 4D

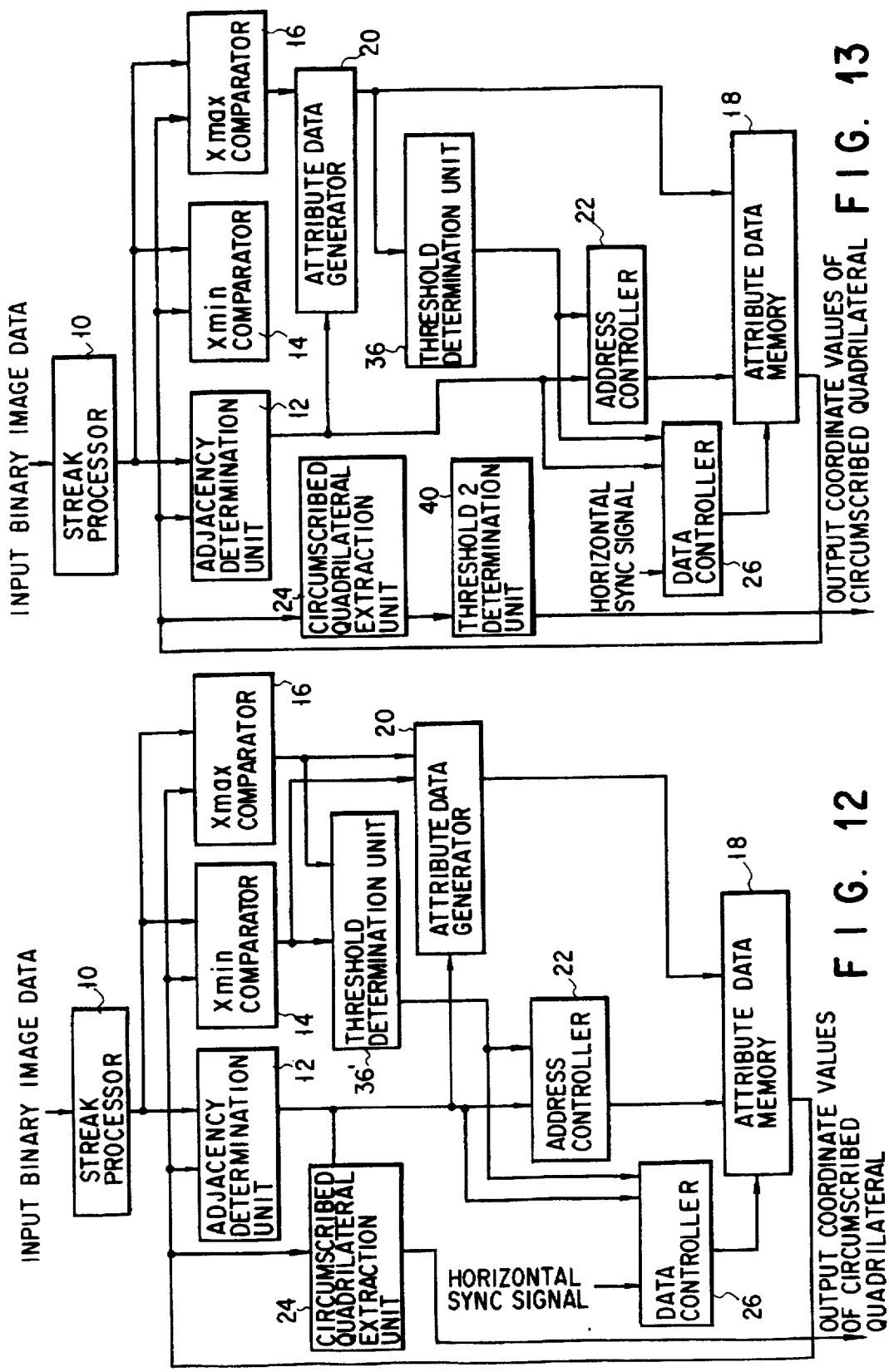

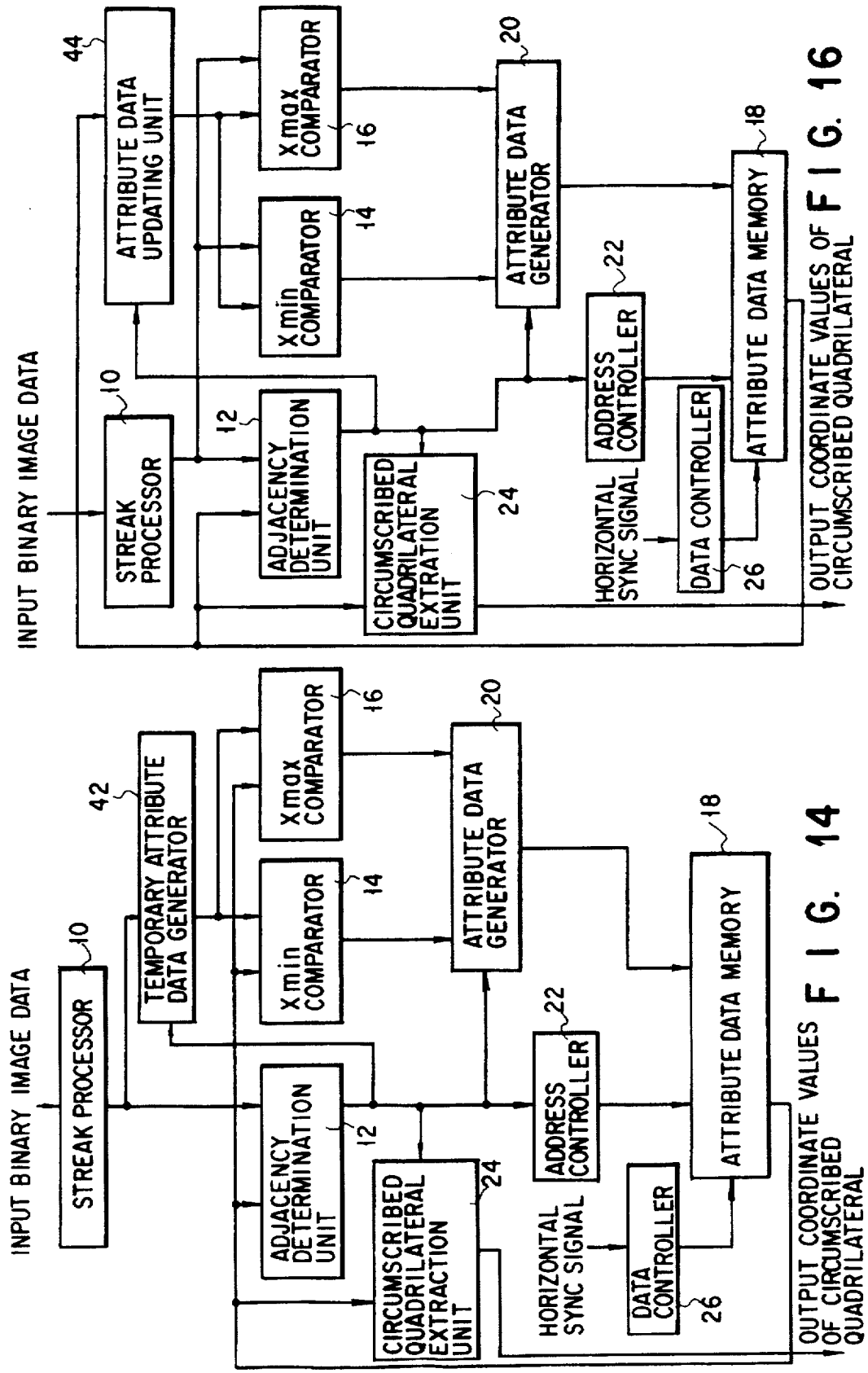

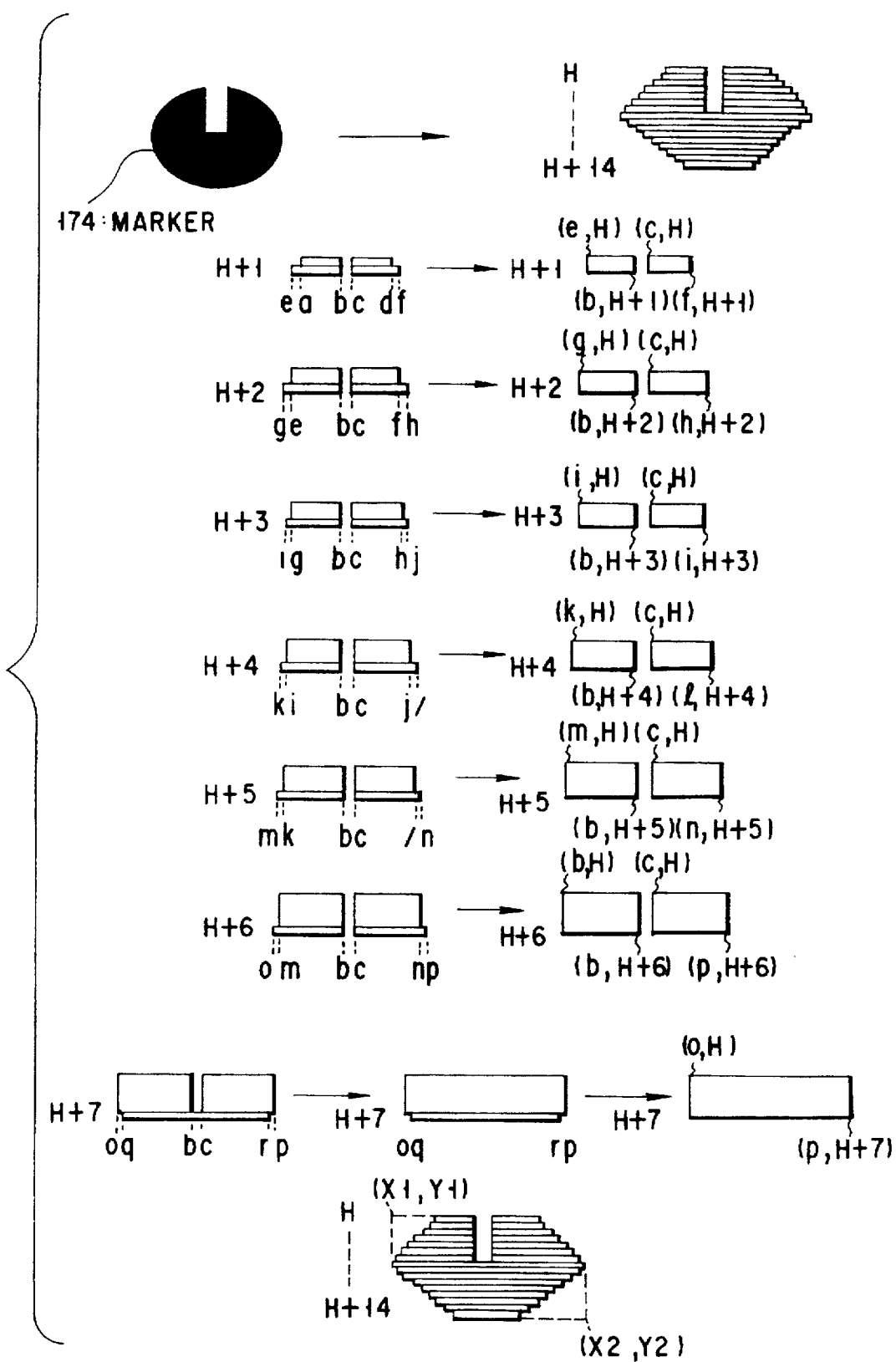
F I G. 17

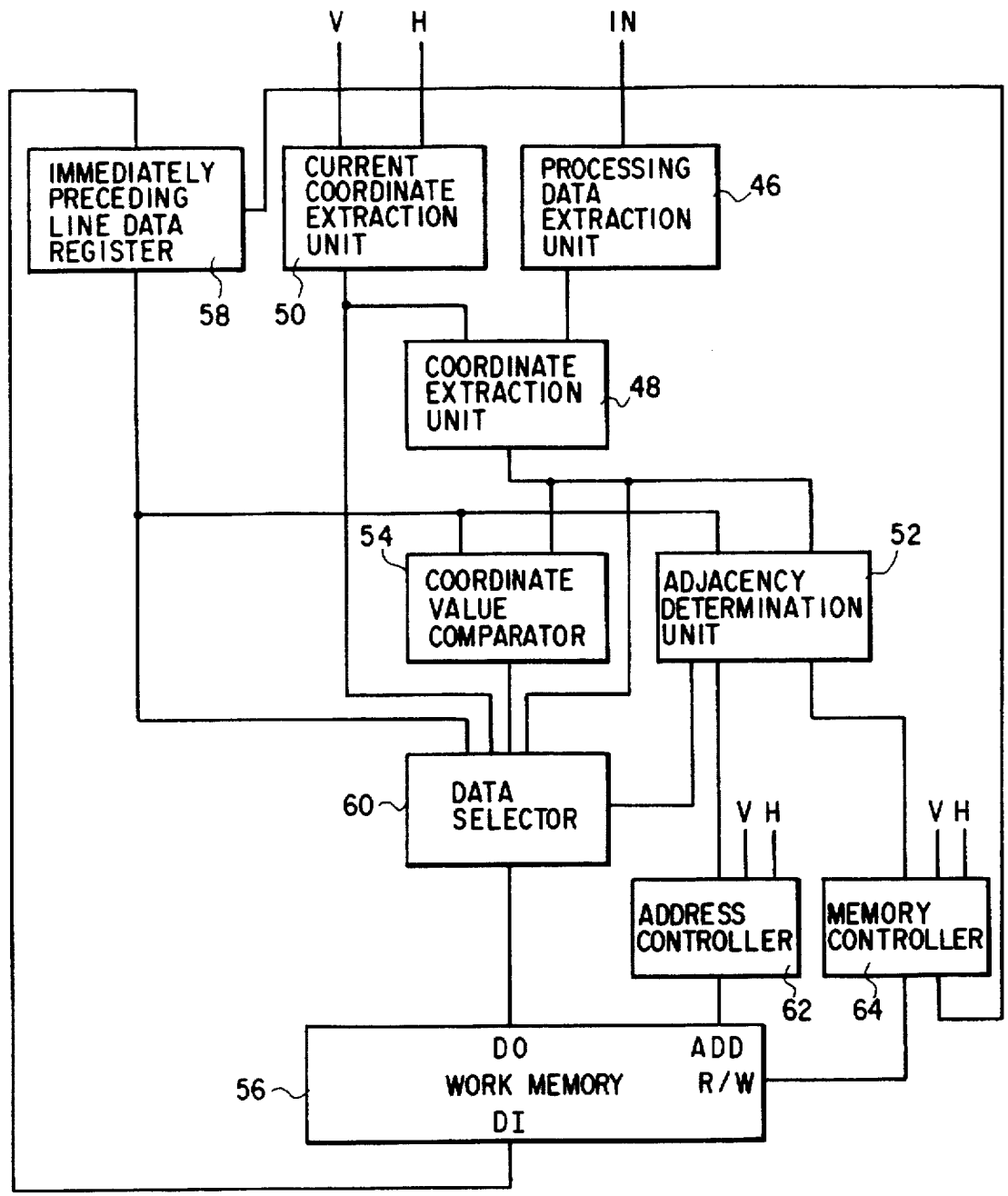
F I G. 18

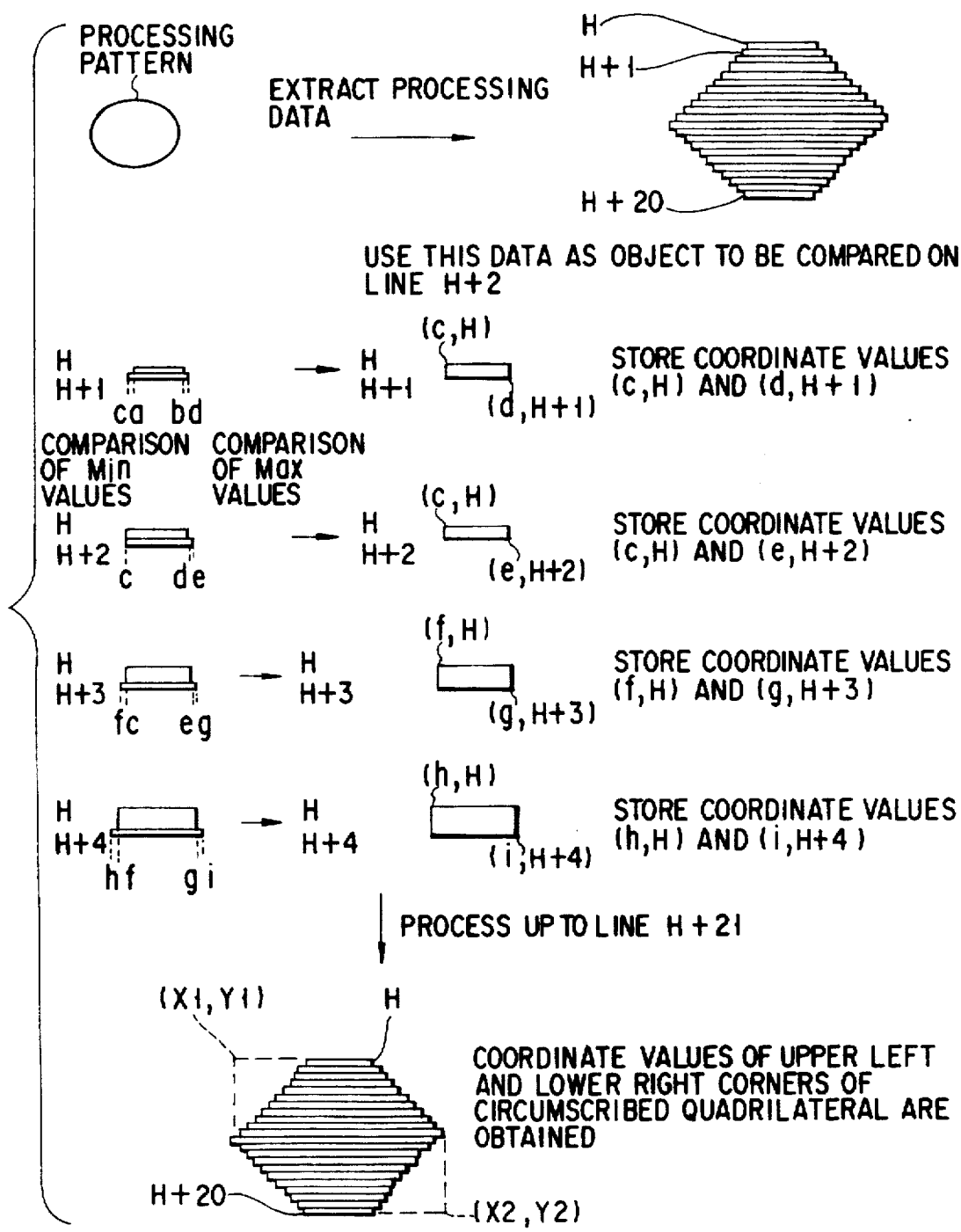
F I G. 21

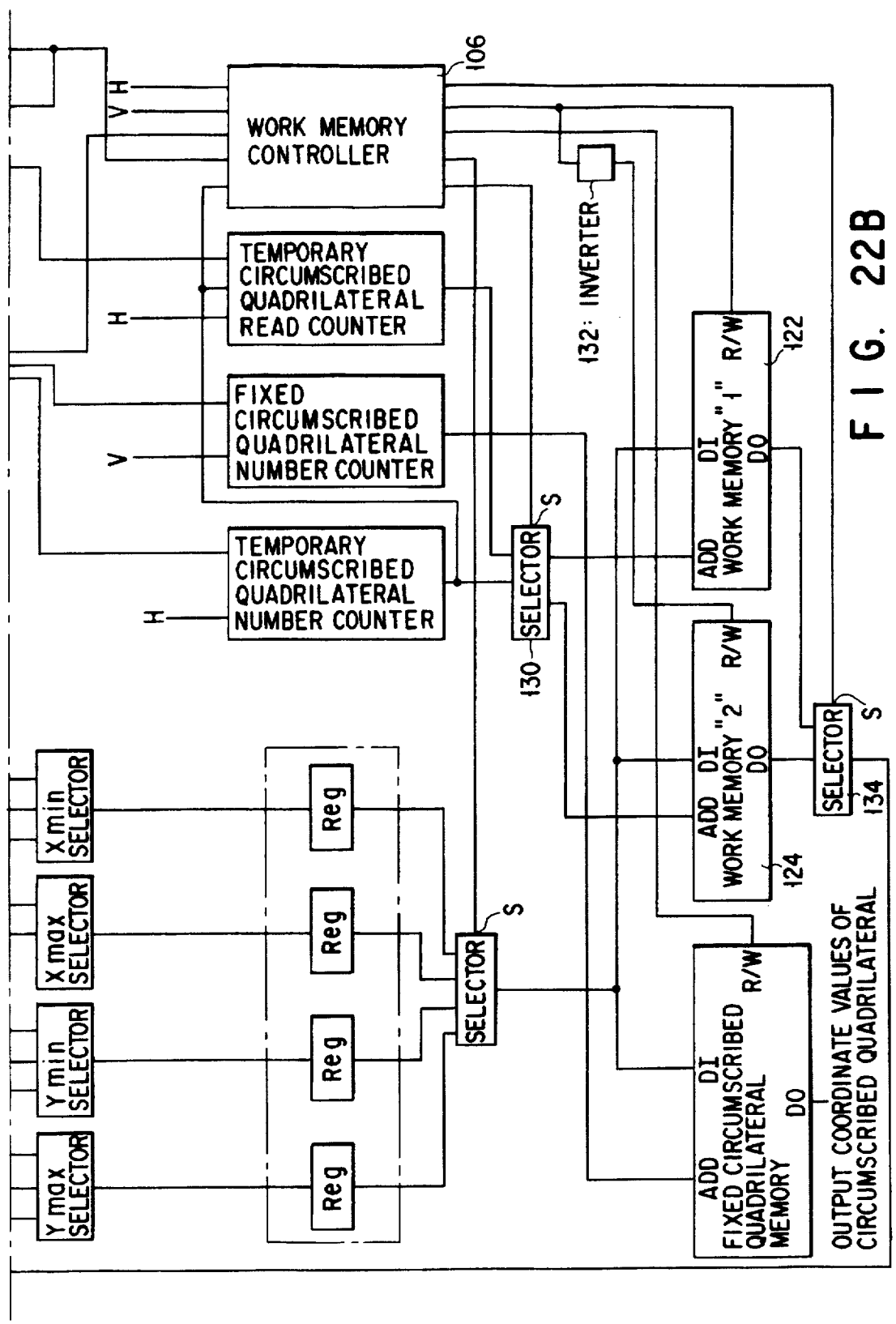

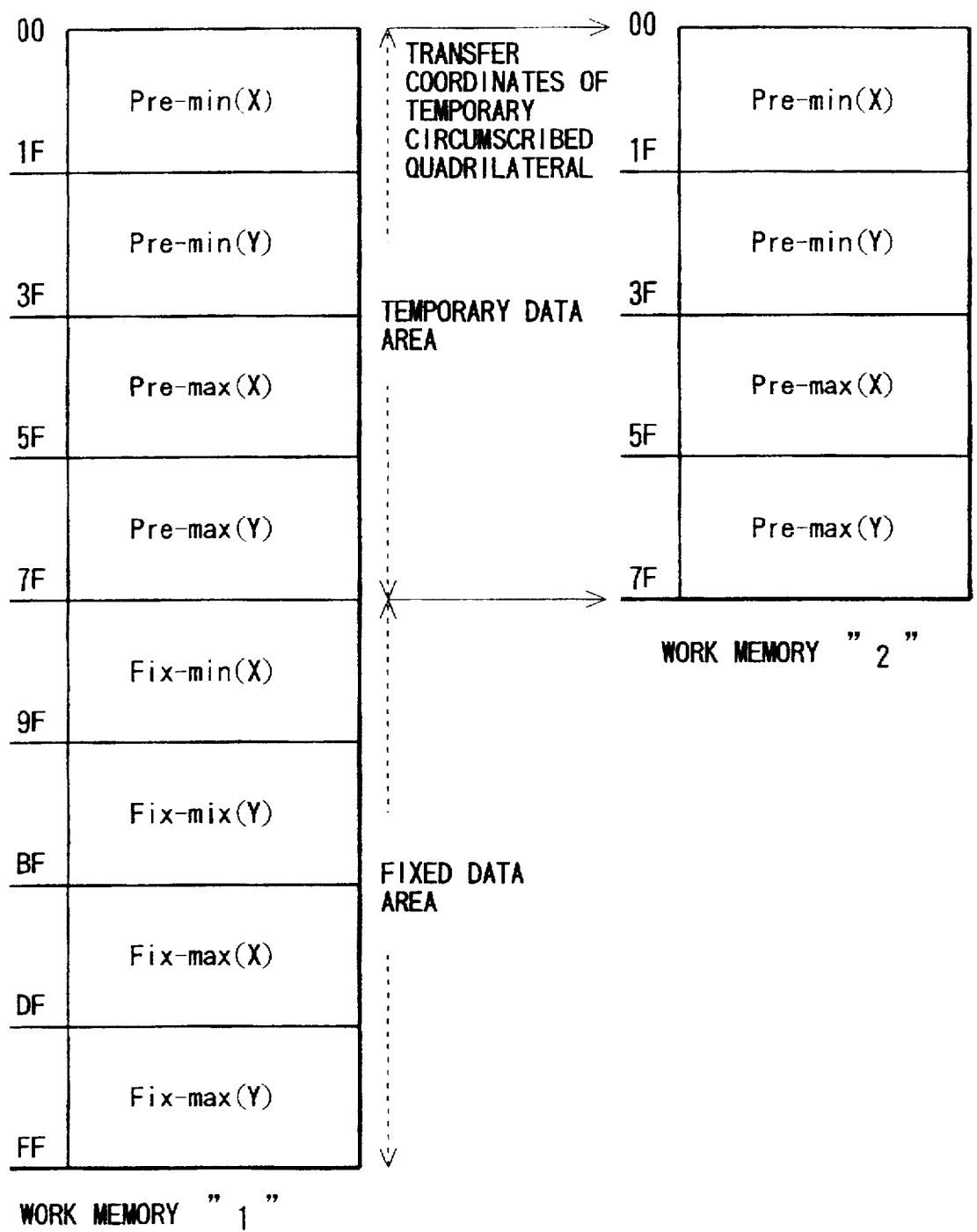
F I G. 26

CODE PATTERN-IMAGE PROCESSING APPARATUS

BACKGROUND OF THE INVENTION

1. Field of the Invention

The present invention relates to an image processing apparatus for setting circumscribed quadrilaterals of specific objects scattered in an input image.

2. Description of the Related Art

Setting circumscribed quadrilaterals is known as one method of separating specific objects scattered in an input image from the rest of the image, such as the background and some other regions.

This setting of circumscribed quadrilaterals is generally performed in three processing steps as follows: temporary labeling processing is performed for an input image, label update processing as final labeling processing is performed, and the coordinate values of a circumscribed quadrilateral of each pattern are calculated.

More specifically, the temporary labeling processing is performed to attach temporary labels in units of pixels to an input image obtained by sequentially reading out binary image data stored in a frame memory in a raster scan manner. Assuming, for example, that a black pixel is a pixel at which data is present, a temporary label "1" is attached to a place where black is found for the first time, and the same labels "1" are attached to black pixels contacting the first black pixel in the horizontal direction. If a black pixel not contacting these black pixels in the horizontal direction is found for the first time, a temporary label "2" is attached to this black pixel. In this way temporary labels are attached. Note that if a pixel is in contact with the run of an upper line, the same temporary label as the upper line run is attached to the pixel. If this temporary labeling processing is performed for one screen, i.e., one frame, various label values are attached to pixels contacting each other to form a single pattern. Therefore, processing of rearranging the label values, i.e., label update processing is performed to attach the same label values to contacting pixels as final labels is performed. After correct labels are thus attached, processing of obtaining circumscribed quadrilaterals of the individual patterns on the basis of the respective label values is performed.

In the above conventional circumscribed quadrilateral setting method, however, the temporary labeling processing and the label update processing are performed in units of frames of an image. Therefore, two frame periods are required before a so-called label image is output from an input image. Accordingly, the coordinate values of a circumscribed quadrilateral which is the final object are output with a delay of two frames or more. Since a delay of two frames or more is required before a circumscribed quadrilateral is obtained, in order to separate a specific object from a corresponding image by using this circumscribed quadrilateral, a memory capable of storing a plurality of frames is necessary in order to hold the original image for a period of two frames or more.

Furthermore, in the conventional circumscribed quadrilateral setting method, adjacency is checked in units of pixels. Therefore, if a specific object is divided or deformed by defects or dirt, it is not possible to accurately extract the true circumscribed quadrilateral of the specific object.

SUMMARY OF THE INVENTION

The present invention has been made in consideration of the above situation and has as its object to provide an image processing apparatus capable of setting circumscribed quadrilaterals without performing arithmetic operations over a plurality of frames.

It is another object of the present invention to provide an image processing apparatus capable of setting accurate circumscribed quadrilaterals even in an image with noise.

According to the first aspect of the present invention, there is provided an image processing apparatus comprising:
- specific object extracting means for extracting a specific object, which is previously defined by a predetermined shape as an object to be extracted, from an image including the specific object; and
- circumscribed quadrilateral setting means for setting a circumscribed quadrilateral of the specific object extracted by the specific object extracting means,
- wherein the specific object extracting means includes streak extracting means which, when a run length in a raster direction of input binary image data is within a predetermined range, extracts a binary data string having a run length within the predetermined range as a streak constituting a part of the specific object, and
- the circumscribed quadrilateral setting means sets a circumscribed quadrilateral for an aggregate of streaks sequentially extracted by the streak extracting means.

According to the second aspect of the present invention, there is provided an image processing apparatus comprising:
- specific object extracting means for extracting a specific object, which is previously defined by a predetermined shape as an object to be extracted, from an image including the specific object; and
- circumscribed quadrilateral setting means for setting a circumscribed quadrilateral of the specific object extracted by the specific object extracting means,
- wherein the specific object extracting means includes:
  - streak extracting means which, when a run length in a raster direction of input binary image data is not less than a first threshold, extracts a binary data string having a run length not less than the first threshold as a streak constituting a part of the specific object; and
  - attribute data generating/storing means which, when a streak extracted by the streak extracting means is adjacent to a previously extracted streak or to a circumscribed quadrilateral based on a previously formed streak aggregate and when a length of the extracted streak is not less than a second threshold larger than the first threshold, substitutes the extracted streak with a streak equal to a length of the previously extracted streak or a length of the circumscribed quadrilateral based on the previously formed streak aggregate, forms a streak aggregate including the substitute streak, and generates and stores attribute data for specifying a circumscribed quadrilateral to be set for the streak aggregate, and
  - the circumscribed quadrilateral setting means sets a circumscribed quadrilateral including the substitute streak of a streak extracted by the streak extracting means, when the extracted streak is adjacent to a previously extracted streak or to a circumscribed quadrilateral set on the basis of the attribute data of the attribute data generating/storing means and when a length of the extracted streak is not less than the second threshold.

According to the third aspect of the present invention, there is provided an image processing apparatus comprising:
- a processing data extraction unit for receiving a binary image signal obtained by raster-scanning an image and removing unnecessary data by detecting a black or white run length;

an adjacency determination unit for checking a connection relationship between data obtained by the processing data extraction unit and a temporary circumscribed quadrilateral of a pattern extracted in an immediately preceding line;

a comparator for comparing edge coordinates of the data obtained by the processing data extraction unit with edge coordinates of the temporary circumscribed quadrilateral;

a temporary circumscribed quadrilateral counter for counting the number of temporary circumscribed quadrilaterals;

a fixed circumscribed quadrilateral counter for counting the number of fixed circumscribed quadrilaterals;

a line counter for counting lines;

a pixel counter for counting pixels in units of lines;

a plurality of work memories for storing temporary circumscribed quadrilaterals; and control means for transferring the coordinate values of the temporary circumscribed quadrilateral between the work memories during a horizontal blanking period, and causing at least one of the work memories to execute write processing during an image effective period.

According to the fourth aspect of the present invention, there is provided an image processing apparatus comprising:

a processing data extraction unit for receiving a binary image signal obtained by raster-scanning an image and removing unnecessary data by detecting a black or white run length;

an adjacency determination unit for checking a connection relationship between data obtained by the processing data extraction unit and a temporary circumscribed quadrilateral of a pattern extracted in an immediately preceding line;

a comparator for comparing edge coordinates of the data obtained by the processing data extraction unit with edge coordinates of the temporary circumscribed quadrilateral;

a temporary circumscribed quadrilateral counter for counting the number of temporary circumscribed quadrilaterals;

a fixed circumscribed quadrilateral counter for counting the number of fixed circumscribed quadrilaterals;

a line counter for counting lines;

a pixel counter for counting pixels in units of lines;

a plurality of work memories for storing temporary circumscribed quadrilaterals; and means for using the work memories while switching write processing and read processing of the work memories.

According to the fifth aspect of the present invention, there is provided an image processing apparatus comprising:

a processing data extraction unit for receiving a binary image signal obtained by raster-scanning an image and removing unnecessary data by detecting a black or white run length;

an adjacency determination unit for checking a connection relationship between data obtained by the processing data extraction unit and a temporary circumscribed quadrilateral of a pattern extracted in an immediately preceding line;

a comparator for comparing edge coordinates of the data obtained by the processing data extraction unit with edge coordinates of the temporary circumscribed quadrilateral;

a temporary circumscribed quadrilateral counter for counting the number of temporary circumscribed quadrilaterals;

a fixed circumscribed quadrilateral counter for counting the number of fixed circumscribed quadrilaterals;

a line counter for counting lines;

a pixel counter for counting pixels in units of lines; and a plurality of work memories, wherein coordinate values of a temporary circumscribed quadrilateral and a fixed circumscribed quadrilateral are stored in one of the work memories.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 2 is a block diagram showing the first embodiment of the present invention;

FIGS. 3A–3C and 4A–4D are views for explaining the operation of a streak processor;

FIG. 6 is a block diagram showing the second embodiment of the present invention;

FIG. 10 is a block diagram of the fourth embodiment of the present invention;

FIGS. 12 and 13 are block diagrams of modifications of the fourth embodiment;

FIG. 14 is a block diagram of the fifth embodiment of the present invention;

FIG. 16 is a block diagram of the sixth embodiment of the present invention;

FIG. 17 is a view for explaining the operation of the sixth embodiment;

FIG. 18 is a block diagram of the seventh embodiment of the present invention;

FIG. 21 is a view for explaining the circumscribed quadrilateral extraction processing in the seventh embodiment;

FIGS. 22A and 22B are block diagrams showing the eighth embodiment of the present invention;

FIG. 26 is a view showing mapping in work memories in the tenth embodiment.

DETAILED DESCRIPTION OF THE PREFERRED EMBODIMENTS

An image processing apparatus of the present invention sets a circumscribed quadrilateral of a specific object to be extracted which is previously defined by a predetermined shape.

Embodiments of the present invention will be described below with reference to the accompanying drawings by taking, as an example of the specific object, a marker in a two-dimensional dot code disclosed in WO94/08314 (corresponding to U.S. Ser. No. 08/407,018) filed by the present applicant.

Figure 1:
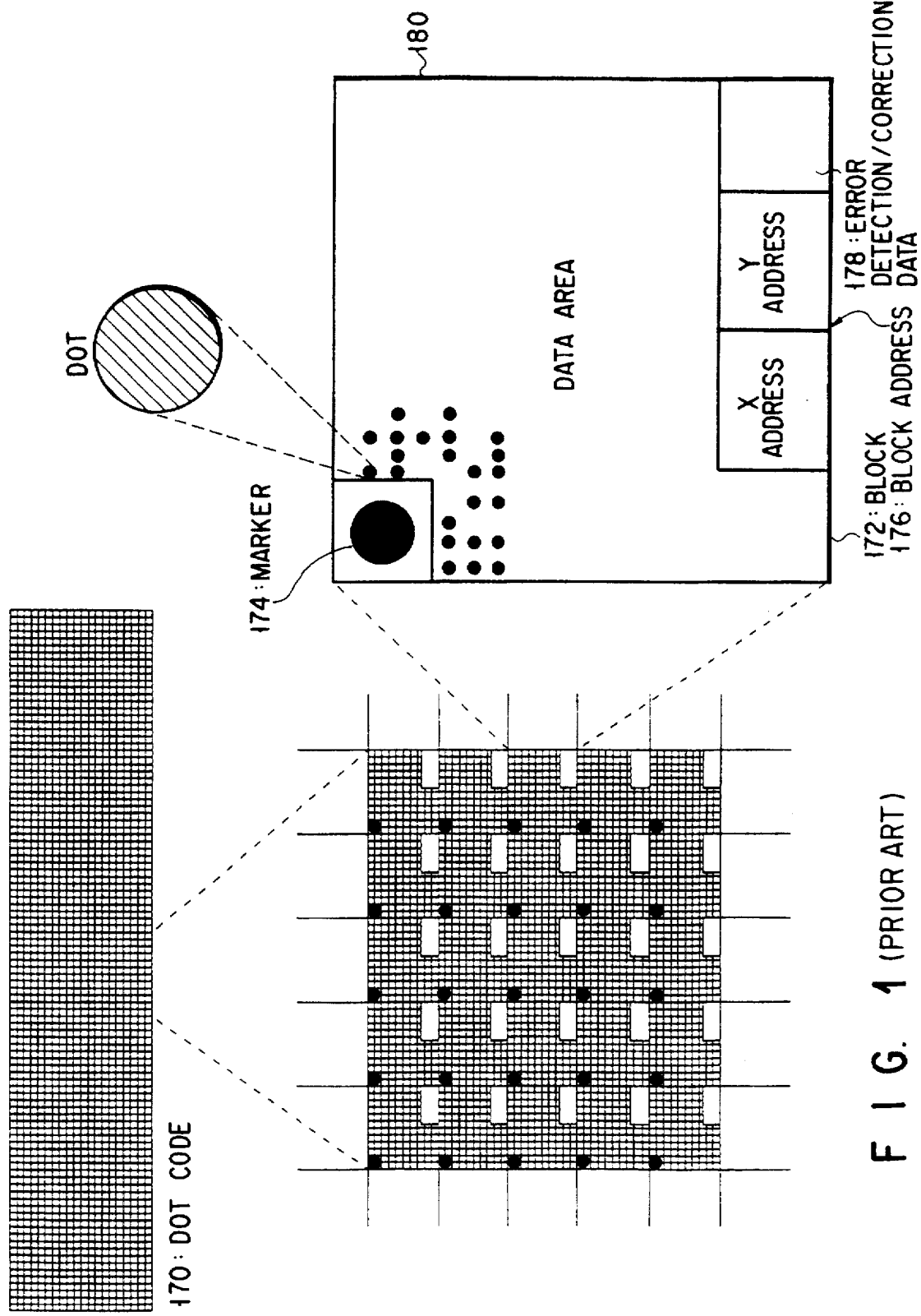
FIG. 1 is a view for explaining the format of a dot code including a marker as an example of a specific object to which a circumscribed quadrilateral is to be set.

WO94/08314 has disclosed a system in which multimedia information including at least one of audio information, video information, and digital code data is recorded on an information recording medium such as paper in the form of a two-dimensional code pattern which is image information which can be transmitted by facsimile and from which a large quantity of copies can be produced inexpensively, i.e., coded information, formed by two-dimensionally arranging a plurality of dots. A system for reproducing this two-dimensional code pattern also is disclosed. The two-dimensional code pattern disclosed in WO94/08314 is as shown in FIG. 1 which corresponds to FIG. 16 in WO94/08314. FIG. 1 illustrates a dot code 170 as a two-dimensional code pattern. In the format of this dot code 170, one block 172 consists of a marker 174, a block address 176, address error detection/correction data 178, and a data area 180 in which actual data is stored. These blocks 172 are two-dimensionally arranged in the vertical and horizontal directions and together form the dot code 170.

To image (scan) the dot code 170 having the above format and restore the original multimedia information, it is necessary to accurately read the individual dots (to be referred to as data dots hereinafter) in the data area 180. In WO94/08314, this read is done by extracting the markers 174, calculating the centroids of these markers 174, defining meshes at predetermined intervals by using the centroids of the markers 174 as read reference points, and reading data at the intersections of the meshes.

The center of a circumscribed quadrilateral of the marker 174 can also be used as the read reference point in place of the centroid of the marker 174.

FIG. 2 is a block diagram showing the first embodiment of the present invention. In FIG. 2, a streak processor 10 performs streak processing, which is well known in the field of image processing, for input binary image data obtained by raster-scanning dot code patterns stored in a frame memory (not shown). In this streak processing, black pixel is found from the input binary image data, and the number of consecutive black pixels or run length is counted from the coordinate of the pixel. That is, as illustrated in FIGS. 3A–3C, the streak processing is to obtain the lengths of consecutive black runs, i.e., the number of consecutive black pixels and the start point of the pixels. Threshold processing is then performed for the obtained result by using a predetermined run length as a threshold n. Consequently, since a dot such as a data dot smaller than the marker has only short streak data, it is determined that all data dot patterns (in which black dots continue in some instances) are smaller than the threshold n. Accordingly, these data dot patterns can be excluded from the subsequent processing.

Furthermore, as shown in FIGS. 4A–4D, this streak processor 10 also performs threshold processing (threshold m) and excludes data having a sufficiently long run length from the subsequent processing.

As described above, in extracting a specific object defined by a predetermined shape, the size of the object is known to some extent in advance. Accordingly, run length data which can be detected to be noise is deleted in the streak processing, and so various subsequent process steps are not executed for such data. Consequently, no wasteful arithmetic operations are performed and image noise also can be deleted.

The output from the streak processor 10 is supplied to an adjacency determination unit 12, a horizontal minimum coordinate value (Xmin) comparator 14, and a horizontal maximum coordinate value (Xmax) comparator 16. The determination unit 12 and the comparators 14 and 16 are supplied with attribute data extracted from the previous line from an attribute data memory 18. The attribute data means the coordinates of the upper left and the lower right corners of an aggregate of a line of interest and streaks in contact with the line of interest, i.e., the parameters of a circumscribed quadrilateral at that time.

The adjacency determination unit 12 compares the coordinate values of the start and end points at which the streaks supplied from the streak processor 10 are present with the attribute data supplied from the attribute data memory 18, thereby checking whether a streak of the current line, i.e., the line of interest is adjacent to a streak of the previous line. The determination result is supplied to an attribute data generator 20, an address controller 22, and a circumscribed quadrilateral extraction unit 24.

The Xmin comparator 14 compares the start point coordinate (X coordinate) value supplied from the streak processor 10 with the attribute data (the X coordinate value of the upper left corner coordinate point of the circumscribed quadrilateral) supplied from the attribute data memory 18. The Xmin comparator 14 selects a smaller coordinate value and outputs the value to the attribute data generator 20.

Analogously, the Xmax comparator 16 compares the end point coordinate (X coordinate) value supplied from the streak processor 10 with the attribute data (the X coordinate value of the lower right corner coordinate point of the circumscribed quadrilateral) supplied from the attribute data memory 18. The Xmax comparator 16 selects a larger coordinate value and outputs the value to the attribute data generator 20.

Figure 5:
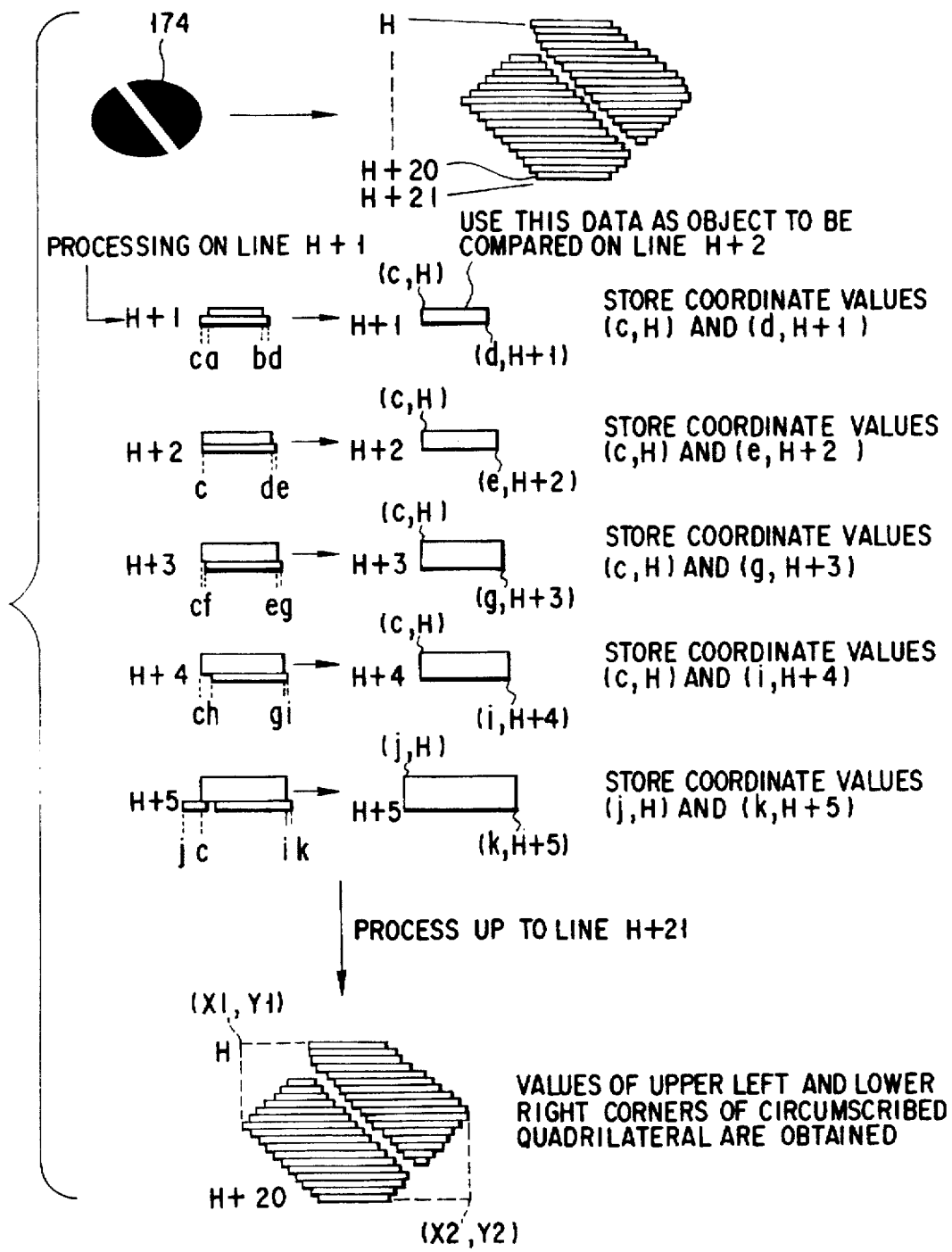
FIG. 5 is a view for explaining the operation of the first embodiment.

Assume, for example, that the line of interest is H in a marker such as illustrated in FIG. 5. Since no attribute data is stored in the attribute data memory 18, the attribute data generator 20 is supplied with the determination result indicating no adjacency from the adjacency determination unit 12, the X coordinate value (e.g., a) of the streak start point of the line of interest from the Xmin comparator 14, and the X coordinate value (e.g., b) of the streak end point of the line of interest from the Xmax comparator 16. Accordingly, the attribute data generator 20 generates coordinate values (a,H) and (b,H) as attribute data and supplies the data to the attribute data memory 18.

Read/write (R/W) of the attribute data memory 18 is controlled by a data controller 26 in accordance with a horizontal sync signal. Also, the address controller 22 supplies read and write addresses to the attribute data memory 18. If the adjacency determination unit 12 determines that there is no adjacency, the address controller 22 generates an address by which the attribute data generated by the attribute data generator 20 is written in the attribute data memory 18 as new data. If the adjacency determination unit 12 determines that there is adjacency, the address controller 22 generates an address by which the attribute data is overwritten, i.e., updated.

If the adjacency determination unit 12 determines that there is no streak of the line of interest and attribute data of the immediately preceding line is present, the circumscribed quadrilateral extraction unit 24 outputs the values of the attribute data supplied from the attribute data memory 18 to the adjacency determination unit 12 at that time as the coordinate values of a circumscribed quadrilateral.

On the other hand, if the line of interest is H+1 in FIG. 5, the adjacency determination unit 12 determines that a streak of the line of interest H+1 is adjacent to a streak of an immediately preceding line H, on the basis of the attribute data, i.e., the coordinate values (a,H) and (b,H), supplied from the attribute data memory 18 and start point coordinates (c,H+1) and end point coordinates (d,H+1) of the streak of the line H+1 supplied from the streak processor 10. The Xmin comparator 14 compares the start point X coordinate value (e.g., c) supplied from the streak processor 10 with the coordinate value (a) supplied from the attribute memory 18, selects a smaller value (in this case c), and outputs the selected value. Similarly, the Xmax comparator 16 compares the end point X coordinate value (e.g., d) supplied from the streak processor 10 with the coordinate value (b) supplied from the attribute data memory 18, selects a larger value (in this case d), and outputs the selected value. Accordingly, the attribute data generator 20 generates coordinate values (c,H) and (d,H+1) as attribute data and supplies the data to the attribute data memory 18. Since the adjacency determination unit 12 determines that there is adjacency, the address controller 22 generates an address by which the above attribute data is overwritten in the address in which the attribute data of the streak of the previous line is stored.

When the above processing is repetitively executed, finally there is no more streak on a line H+21. Therefore, the adjacency determination unit 12 supplies a signal indicating no adjacency to the circumscribed quadrilateral extraction unit 24. Upon receiving the signal, the circumscribed quadrilateral extraction unit 24 generates attribute data supplied from the attribute data memory 18 at that time and outputs coordinate values (X1,Y1) and (X2,Y2), which are the streak attribute data of a previous line H+20, as circumscribed quadrilateral coordinate values.

If adjacent data are found to be present between lines in performing adjacency determination between lines as described above, a circumscribed quadrilateral constituted by these adjacent data is used as attribute data, and adjacency determination is performed between this attribute data and data of the next line. Consequently, a circumscribed quadrilateral can be accurately obtained even if the marker 174 has a fine defect as illustrated in FIG. 5. That is, when adjacency determination is performed between attribute data extracted in the previous line and data on the line of interest, even a pattern having such a defect as indicated by the case of a line of interest H+5 in FIG. 5 can be recognized as a single pattern.

The second embodiment of the present invention will be described below. FIG. 6 is a block diagram showing the configuration of this embodiment, in which the same reference numerals as in FIG. 2 denote the same parts. The second embodiment is characterized in that an upper-limiting threshold determination unit 28 is provided between a streak processor 10 and an adjacency determination unit 12, an Xmin comparator 14, and an Xmax comparator 16. When the run length of a streak exceeds a threshold m1, this upper-limiting threshold determination unit 28 supplies a signal indicating this information to the Xmin and Xmax comparators 14 and 16 and forces the comparators 14 and 16 to select data of the previous line.

Figure 7:
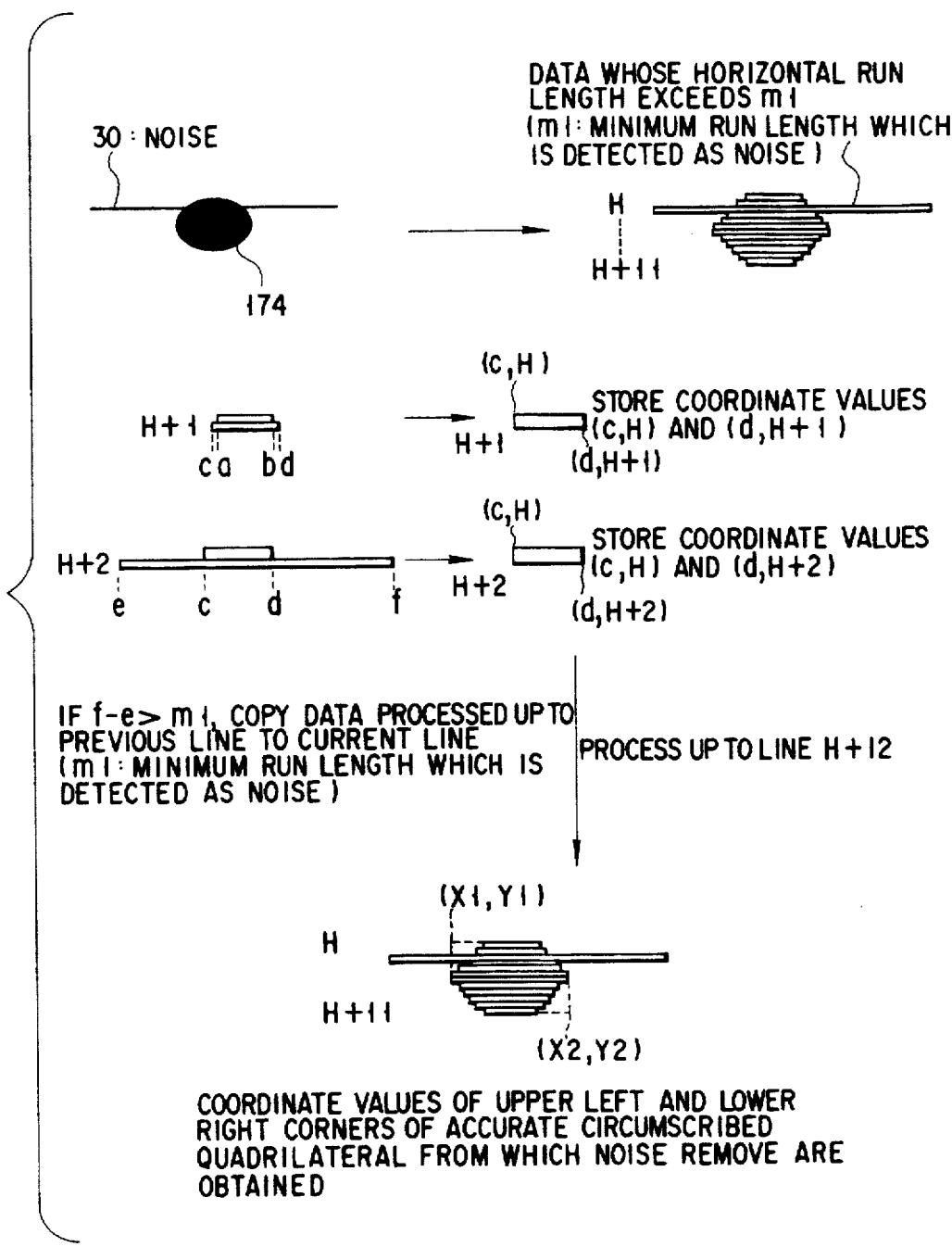
FIG. 7 is a view for explaining the operation of the second embodiment.

If noise 30 like a horizontal line is present on a marker 174 as illustrated in FIG. 7, the second embodiment can eliminate the influence of this noise 30.

That is, if the streak processor 10 extracts a very long streak in the horizontal direction which cannot be the marker 174, this streak is obviously the noise 30. Therefore, the threshold m1 for determining the noise is determined in advance. Since a streak which is assumed to be noise is input on a line (H+2) in FIG. 7, the run length (=f−e) of this streak exceeds the threshold m1 in the upper-limiting threshold determination unit 28. If this is the case, attribute data ((c,H),(d,H+2)) is generated by using the length (coordinates c and d) in the horizontal direction of attribute data extracted in a previous line (H+1) and stored in an attribute data memory 18, even if the adjacency determination unit 12 determines that there is adjacency.

More specifically, if data like a horizontal line having a sufficiently large run length exists in the horizontal direction in a certain line of a specific pattern such that the data is adjacent to the specific pattern, the specific pattern is divided into upper and lower portions if this noise is deleted. Therefore, data of this line is replaced with attribute data of the previous line to generate new attribute data whose height is incremented by 1 from the height of the attribute data present on the previous line. That is, if data having a run larger than a run length which is detected to be noise is adjacent to attribute data extracted in the previous line, this data is replaced with data having the run length in the horizontal direction of the attribute data of the previous line. Consequently, it is possible to extract a circumscribed quadrilateral of a desired pattern without dividing a specific pattern.

Figure 8:
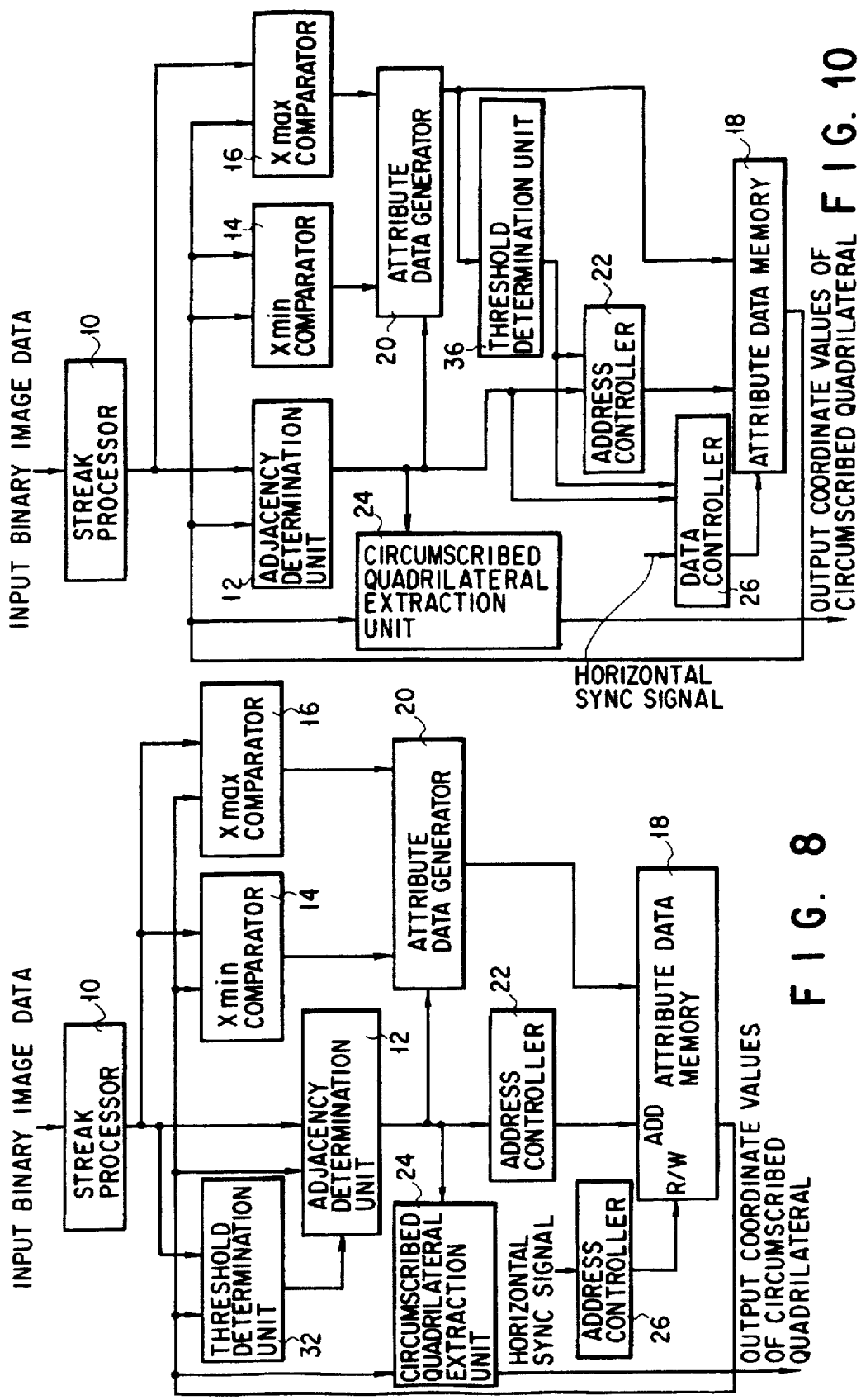
FIG. 8 is a block diagram of the third embodiment of the present invention.

The third embodiment of the present invention will be described below. FIG. 8 is a block diagram showing the configuration of the third embodiment, in which the same reference numerals as in FIG. 2 denote the same parts. This third embodiment is characterized by a threshold determination unit 32 which receives a streak from a streak processor 10 and attribute data of a streak of the previous line from an attribute data memory 18, compares the received data with a certain threshold, and supplies the result to an adjacency determination unit 12.

Figure 9:
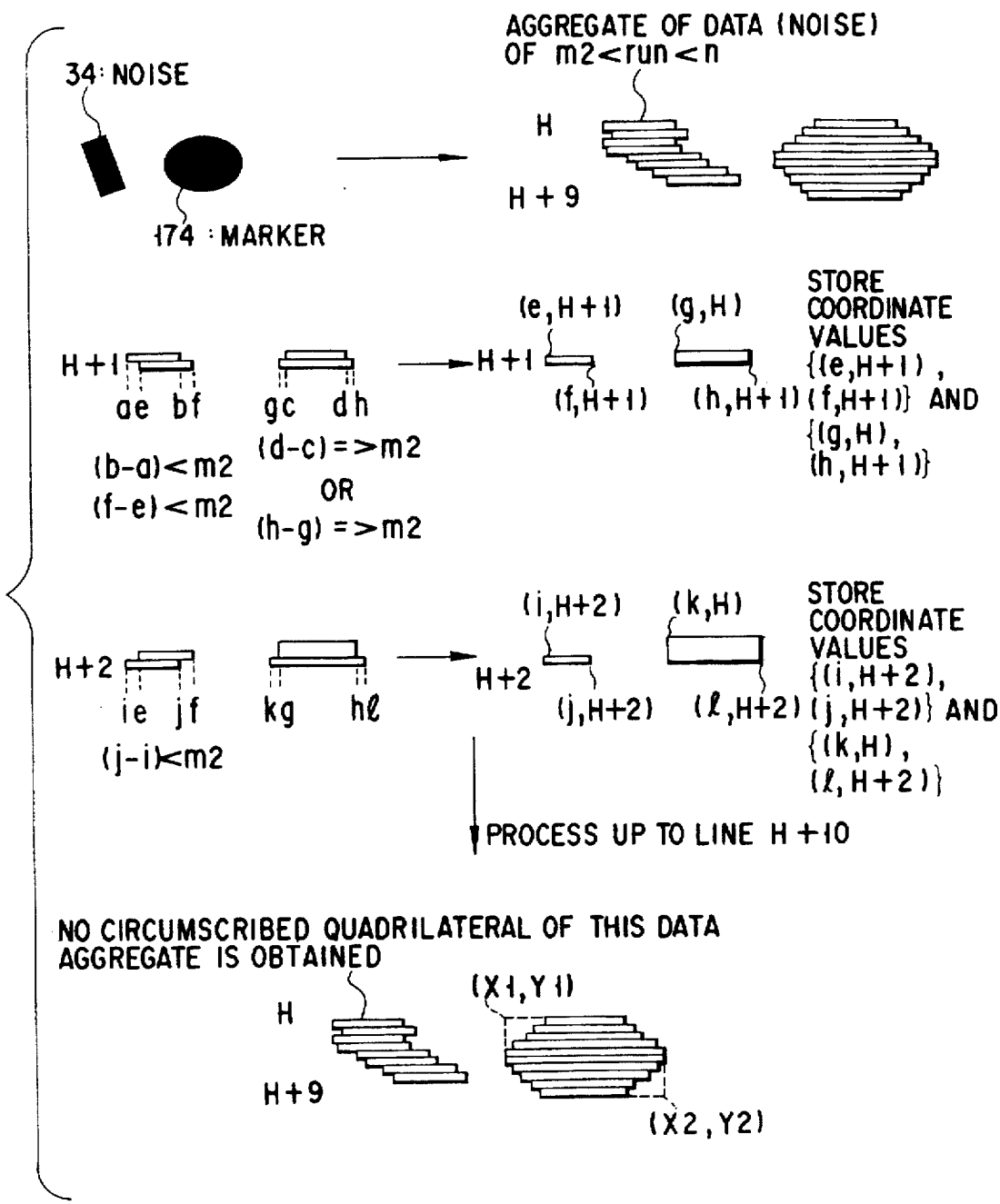
FIG. 9 is a view for explaining the operation of the third embodiment.

As shown in FIG. 9, this third embodiment deletes small dust (noise 34) which is extracted by a streak. That is, in the first and second embodiments described above, attribute data is regenerated if a given streak and attribute data are found to be adjacent to each other. In this embodiment, on the other hand, a threshold is provided for the conditions of adjacency. This threshold is set to n+α(=m2) which is slightly larger than a threshold n which is used by the streak processor 10 to delete small streaks.

A marker 174 is basically a circle. Accordingly, the length of a streak found for the first time is slightly shorter than the next line, and streaks gradually lengthen as the number of lines increases and gradually shorten after passing a certain line. Therefore, adjacency is not determined unless one of attribute data and a streak exceeds the threshold m2. That is, data having a certain small run length (n) in the horizontal (X) direction is deleted by the streak processing. However, adjacency between lines is determined only when the run length of one of the data as objects of determination is n+α(=m2).

More specifically, the adjacency determination unit 12 compares a run which is n or longer in the horizontal direction extracted by the streak processor 10 with attribute data of a streak of the previous line supplied from the attribute data memory 18. If small noise (aggregate data of a run of about n) 34 exists in an input image, the adjacency determination unit 12 also detects this small pattern. Therefore, if both of the run length (f–e) of a streak supplied from the threshold determination unit 10 and a run length (b–a) of a streak of the previous. line indicated by attribute data supplied from the attribute data memory 18 are equal to or smaller than the threshold m2, such as in the case of a line H+1 in FIG. 9, the threshold determination unit 32 forces the adjacency determination unit 12 to determine no adjacency. In accordance with this determination result, an address controller 22 and a data controller 26 control the attribute data memory 18 to discard the data of the previous line. As a consequence, it is possible to extract only a circumscribed quadrilateral of a desired pattern without detecting the small noise 34 in an input image.

The fourth embodiment of the present invention will be described below. FIG. 10 is a block diagram showing the configuration of the fourth embodiment, in which the same reference numerals as in FIG. 2 denote the same parts. This fourth embodiment is characterized by a threshold determination unit 36 which performs threshold processing for attribute data reproduced by an attribute data generator 20 and supplies the outcome to an address controller 22 and a data controller 26.

Figure 11:
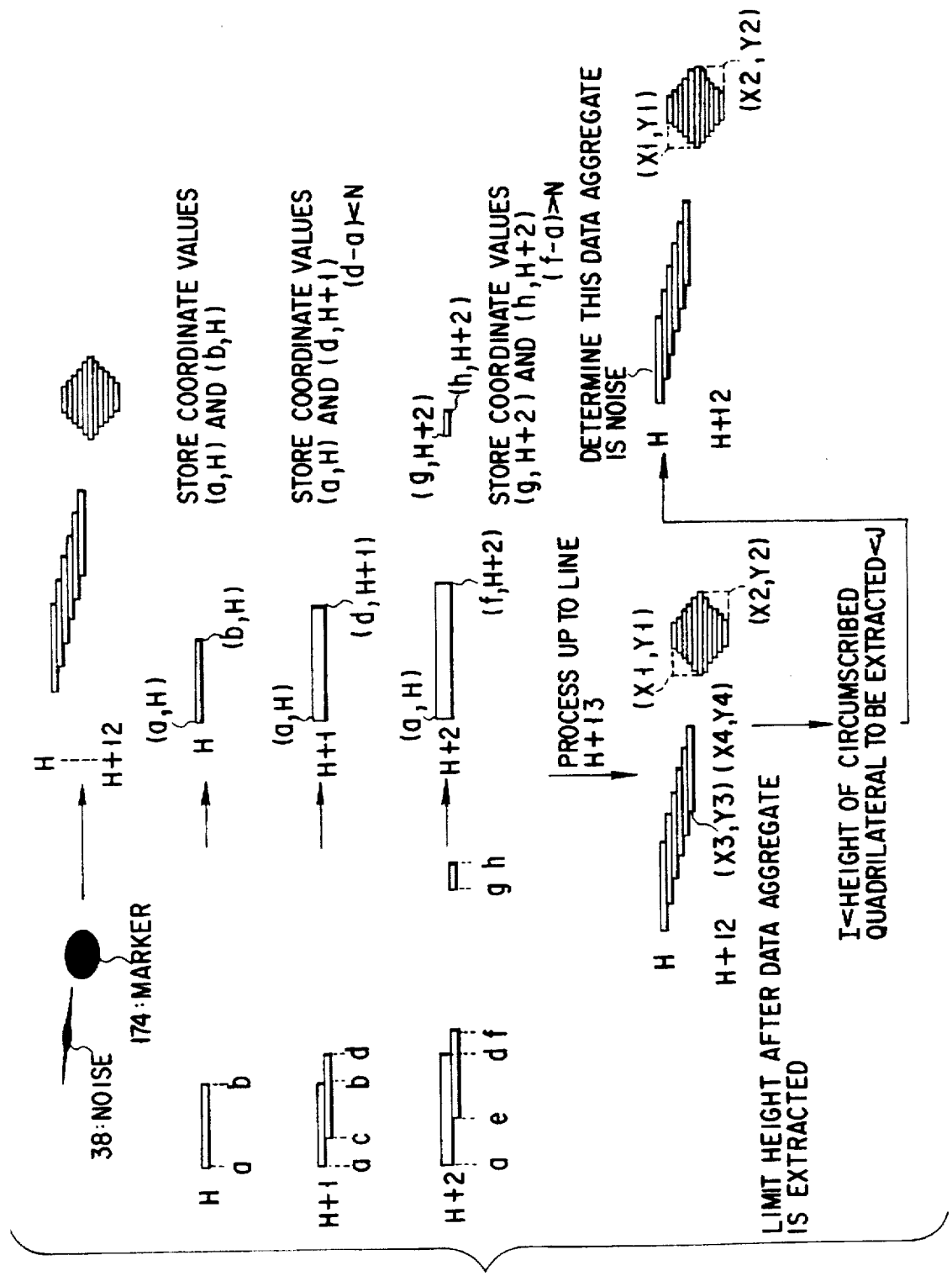
FIG. 11 is a view for explaining the operation of the fourth embodiment.

That is, this fourth embodiment relates to a method of handling noise 38 represented by a parallelogram as illustrated in FIG. 11. Although the size of one streak of such noise 38 is not so large, the noise 38 increases its size in the horizontal direction as it is replaced by circumscribed quadrilaterals by adjacency determination. Therefore, the threshold determination unit 36 performs threshold processing for the size in the horizontal direction of a circumscribed quadrilateral with respect to attribute data generated by the attribute data generator 20. When this size exceeds an upper-limiting threshold N, the address controller 22 and the data controller 26 so control an attribute data memory 18 as to discard all circumscribed quadrilaterals.

That is, attribute data generated when adjacency between lines is determined is deleted if the run length in the horizontal direction of the attribute data is large to some extent. More specifically, when parallelogrammatic noise 38 exists in an input image, this noise does not have a very large run length per line. However, each time attribute data is generated by adjacency determination the run length in the horizontal direction of the attribute data increases. Accordingly, if the run length exceeds the value of a run length which is detected to be noise by adjacency determination, the attribute data is deleted and consequently the noise can be deleted.

Instead of the threshold determination unit 36 for performing threshold processing for the generated attribute data, it is of course possible to provide a threshold determination unit 36', FIG. 12, which performs threshold processing for the comparison results from an Xmin comparator 14 and an Xmax comparator 16 and, in accordance with the outcome of the processing, controls the attribute data memory 18 so that the attribute data is not written in the memory.

As illustrated in FIG. 13, it is also possible to add a threshold 2 determination unit 40 for performing threshold processing of removing an extracted circumscribed quadrilateral which is too small in the direction of height. That is, as shown in the lower part of FIG. 11, if parallelogrammatic noise 38 is small the attribute data sometimes does not exceed the threshold N in the threshold determination unit 36 and remains. Therefore, thresholds I and J in the direction of height are provided to delete such attribute data. More specifically, if the height of an extracted circumscribed quadrilateral is small to some extent or larger than a certain value, this circumscribed quadrilateral is not extracted. In this embodiment, it is determined that the parallelogrammatic noise 38 is noise because the circumscribed quadrilateral of the parallelogrammatic noise 38 is larger than I or J.

The fifth embodiment of the present invention will be described below. FIG. 14 is a block diagram showing the configuration of the fifth embodiment, in which the same reference numerals as in FIG. 2 denote the same parts. This fifth embodiment is characterized by a temporary attribute data generator 42 which generates temporary attribute data by connecting a plurality of streaks from a streak processor 10 in accordance with the determination result from an adjacency determination unit 12 and supplies the generated data to an Xmin comparator 14 and an Xmax comparator 16.

Figure 15:
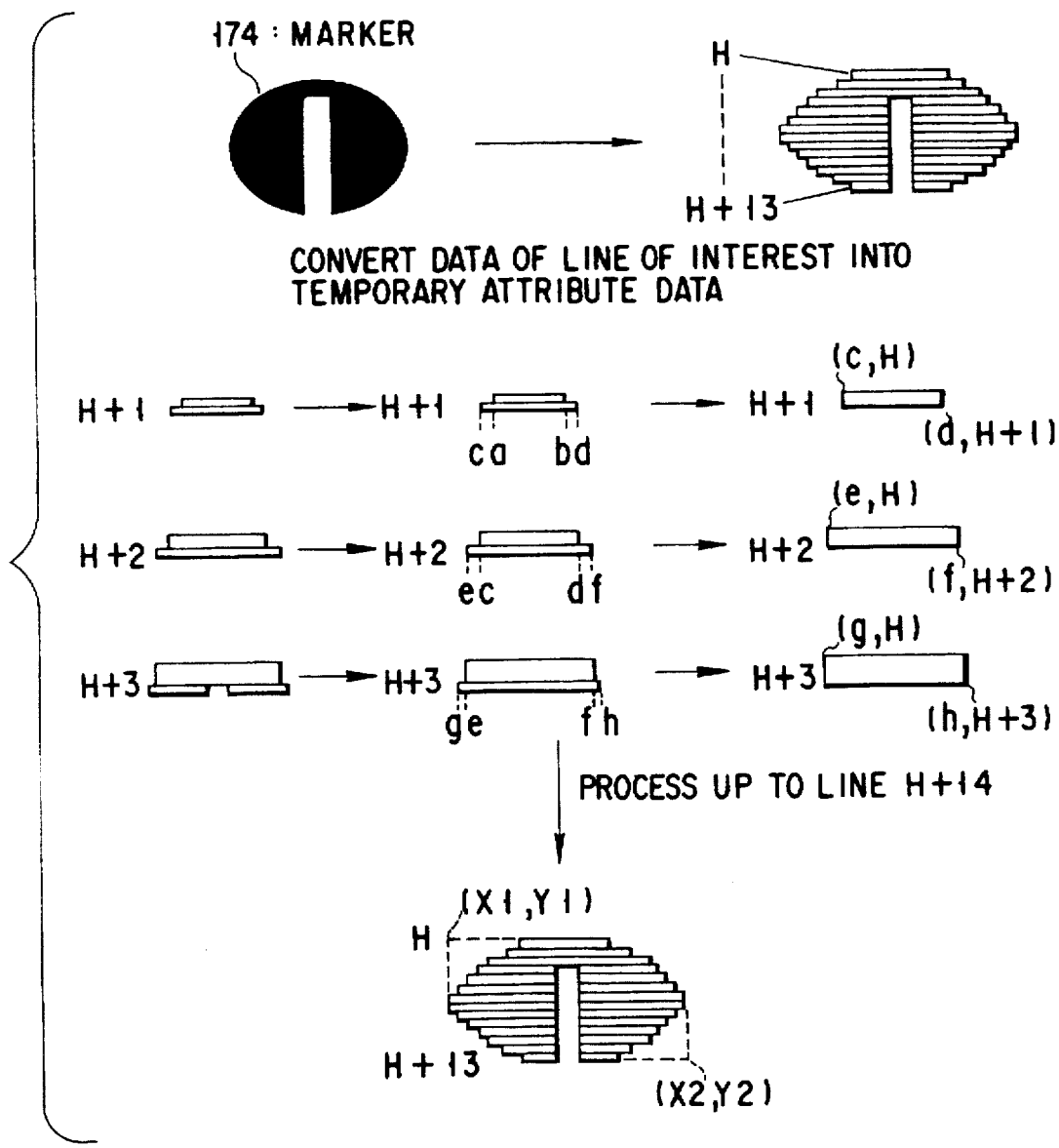
FIG. 15 is a view for explaining the operation of the fifth embodiment.

That is, the fifth embodiment handles a marker 174 having a vertical defect in its lower portion as shown in FIG. 15. In the first to fourth embodiments described previously, each of adjacency determination and comparison must be performed twice for the marker 174 having such a defect. In this embodiment, therefore, when the adjacency determination unit 12 determines that one attribute data is adjacent to a plurality of streaks, such as in the case of a line H+3 in FIG. 15, the temporary attribute data generator 41 connects a plurality of output streaks from the streak processor 10 into one data. The Xmin comparator 14 and the Xmax comparator 16 perform comparison processing for this temporary attribute data. In this manner the amount of arithmetic operations is reduced.

That is, when adjacency determination is performed, a streak of a line of interest is converted into unique attribute data (temporary attribute data) of the line of interest in accordance with the adjacency information. This temporary attribute data is compared with attribute data extracted in the previous line. More specifically, if a pattern having a defect extending downward from its middle portion is input, in a certain line one attribute data is in contact with a plurality of streaks of a line of interest. In this case it is necessary to perform data comparison a plurality of number of times by using data in a single pattern. However, data comparison needs to be performed only once if temporary attribute data is formed by connecting streaks, when adjacency determination is performed, so that these streaks are contained in one circumscribed quadrilateral, and this temporary attribute data is compared with attribute data of the previous line. The result is that the number of arithmetic operations during the processing is reduced.

The sixth embodiment of the present invention will be described below. FIG. 16 is a block diagram showing the configuration of the sixth embodiment, in which the same reference numerals as in FIG. 2 denote the same parts. This sixth embodiment is characterized by an attribute data updating unit 44 which updates attribute data of the previous line from an attribute data memory 18 in accordance with the determination result from an adjacency determination unit 12 and supplies the outcome to an Xmin comparator 14 and an Xmax comparator 16.

That is, this sixth embodiment handles a marker 174 having a vertical defect in its upper portion, not in the lower portion as in the fifth embodiment, as illustrated in FIG. 17. Referring to FIG. 17, one streak is in contact with a plurality of attribute data on a line (H+7). If this is the case, the attribute data updating unit 44 updates, i.e., connects, these attribute data at the time the adjacency determination unit 12 determines that these attribute data are adjacent to one streak. If these attribute data are different in height, the largest height is used. Since the attribute data thus updated is compared with a streak of a line of interest, the amount of arithmetic operations during the processing is reduced.

That is, when adjacency determination is performed between a streak of a line of interest and attribute data, the attribute data is converted into new attribute data in accordance with the adjacency information, and this new attribute data is compared with the data on the line of interest. More specifically, when a specific pattern having a vertical defect in its upper portion is input, in a certain line one data on a line of interest is in contact with a plurality of attribute data extracted in the previous line. In this case it is necessary to perform data comparison a plurality of number of times by using data in a single pattern. However, this comparison processing needs to be performed only once if the attribute data is updated in accordance with adjacency information when adjacency determination is performed, and compared with the data on the line of interest.

The seventh embodiment of the present invention will be described below. FIG. 18 is a block diagram showing the configuration of the seventh embodiment, in which a processing data extraction unit 46, a coordinate value extraction unit 48, and a current coordinate extraction unit 50 correspond to the streak processor 10 in the previous embodiments. The processing data extraction unit 46 checks the run length of a binary image which is input by raster scan from an image input device (not shown) such as an image pickup device, and extracts only a run (streak) of "1"s or "0"s having a certain length or more. The coordinate value extraction unit 48 detects the leading edge and the trailing edge coordinates of this streak. The current coordinate extraction unit 50 extracts the coordinate values of a target pixel.

An adjacency determination unit 52 corresponds to the adjacency determination unit 12 in the previous embodiments. The adjacency determination unit 52 checks adjacency between a streak of a line of interest and data processed in the immediately preceding line. A coordinate value comparator 54 corresponds to the Xmin comparator 14 and the Xmax comparator 16 in the previous embodiments. The coordinate value comparator 54 compares the edge coordinate values of the streak with the coordinate values of the data of the immediately preceding line.

A work memory 56 and an immediately preceding line data register 58 correspond to the attribute data memory 18 in the previous embodiments. The work memory 56 stores data selectively extracted by a data selector 60. The immediately preceding line data register 58 stores the coordinate data of a temporary circumscribed quadrilateral selected and extracted in the immediately preceding line. The data selector 60 corresponds to the attribute data generator 20 in the previous embodiments. In accordance with the conditions in the coordinate value extraction unit 48, the adjacency determination unit 52, and the coordinate value comparator 54, the data selector 60 selectively outputs the current coordinate data extracted by the current coordinate extraction unit 50 or the coordinate data of a temporary circumscribed quadrilateral stored in the immediately preceding line data register 58. An address controller 62 corresponds to the address controller 22 in the previous embodiments and generates an address by which data is stored in the work memory 56. A memory controller 64 corresponds to the data controller 26 in the previous embodiments and controls the work memory 56.

The operation of the image processing apparatus with the above configuration will be described below. The processing data extraction unit 46 extracts only data (streak) having a run of a certain value or more from input binary data. The coordinate value extraction unit 48 detects the coordinate values of the leading and trailing edges of the streak. Also, the adjacency determination unit 52 checks whether the streak of the line of interest is adjacent to data extracted in the previous line. More specifically, the adjacency determination unit 52 checks whether a region from the leading edge coordinate value to the trailing edge coordinate value of the streak of the line of interest overlaps a region from the minimum value (Xmin) to the maximum value (Xmax) in the horizontal direction of a temporary circumscribed quadrilateral (the extracted data of the previous line). If these two regions overlap, the adjacency determination unit 52 determines that the temporary circumscribed quadrilateral is adjacent to the streak of the line of interest.

If the adjacency determination unit 52 determines that the two data (the streak of the line of interest and the temporary circumscribed quadrilateral) are adjacent, the coordinate value comparator 54 compares the left-side coordinates and the right-side coordinates of the two data in the adjacent regions and outputs a smaller coordinate value in the left-side comparison and a larger coordinate value in the right-side comparison. The data selector 60 selects these two coordinate values, the minimum vertical coordinate value of the data of the immediately preceding line, and an output vertical coordinate value from the current coordinate extraction unit 50, and stores these values in the work memory 56 as new data (temporary circumscribed quadrilateral).

If a streak of a line of interest is present and there is no data of the immediately preceding line, the data selector 60 selects the coordinate values of the leading and trailing edges of the streak of the line of interest and the vertical coordinate value from the current coordinate extraction unit 50, and stores these values in the work memory 56 as new data (temporary circumscribed quadrilateral).

On the other hand, if data of the immediately preceding line is present and there is no streak of a line of interest, the data of the immediately preceding line is regarded as the coordinate values of a fixed circumscribed quadrilateral and output externally.

As described above, data (temporary circumscribed quadrilateral) extracted in the immediately preceding line is read out in a line of interest in the order of extraction in the previous line so that the circumscribed quadrilateral is extracted in the same horizontal time sequence. A circumscribed quadrilateral of a specific pattern can be obtained by performing this processing for a period of one screen (one frame period) for each line. Since no labeling processing is necessary, a circumscribed quadrilateral of the immediately preceding image can be obtained in one frame period, i.e., real-time processing can be performed.

Figure 19A:
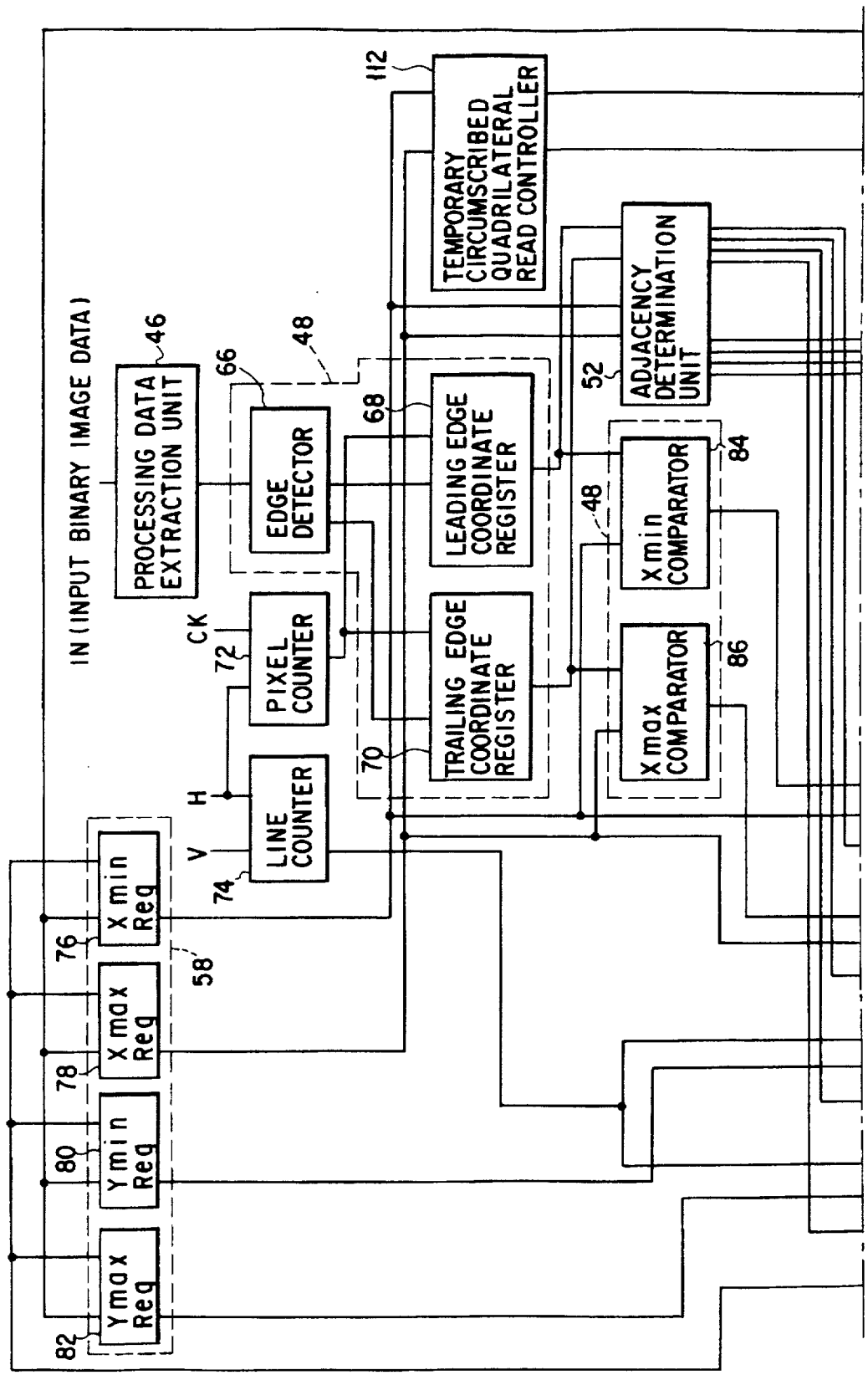
FIGS. 19A and 19B are block diagrams showing detailed configurations of the seventh embodiment.
Figure 19B:
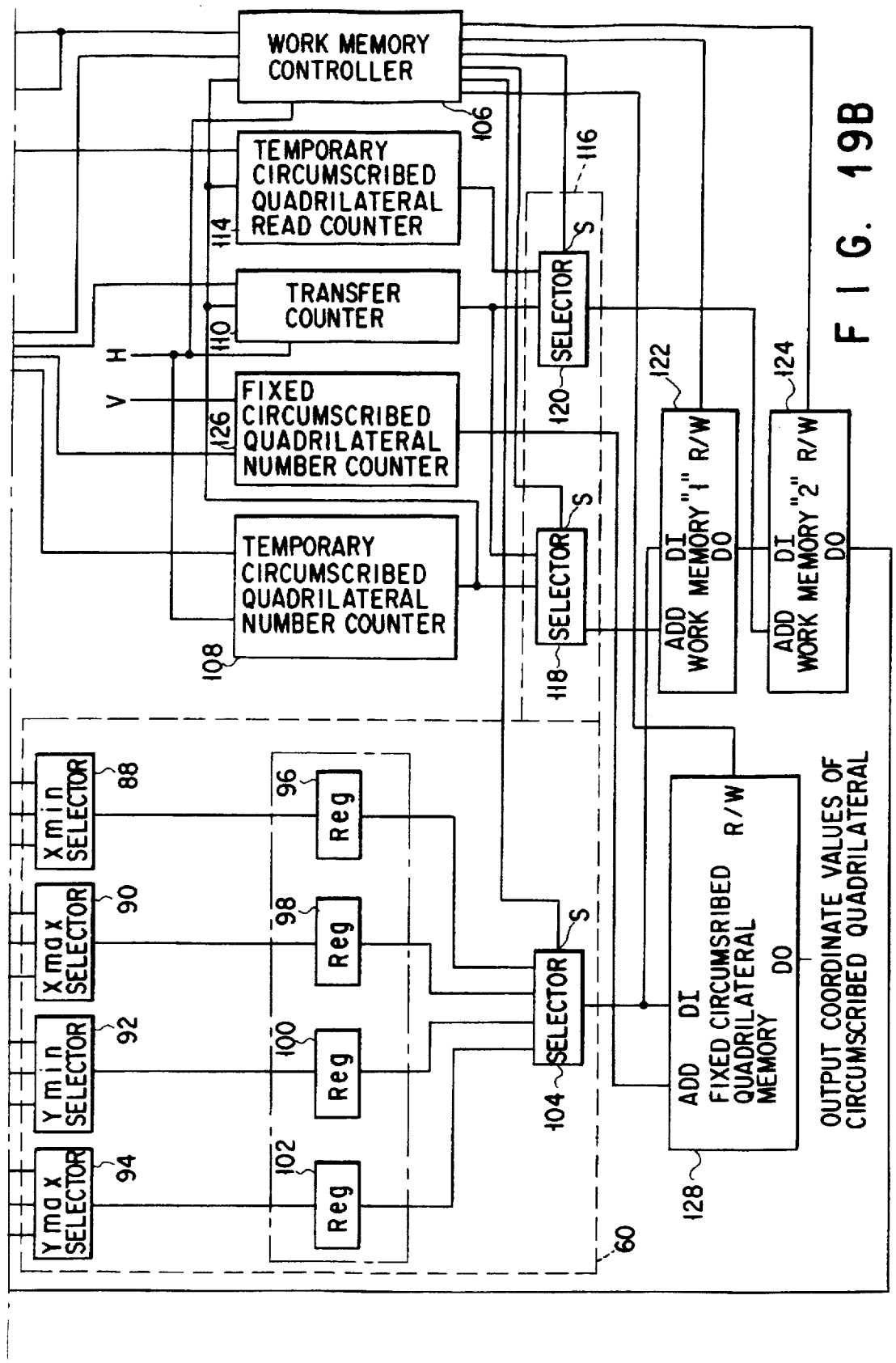

Detailed configurations of this embodiment will be described below with reference to FIGS. 19A and 19B. In FIGS. 19A and 19B, the processing data extraction unit 46 checks the run length of binary image data which is input by raster scan, and extracts data (streak) from which unnecessary data is deleted. In the coordinate value extraction unit 48, an edge detector 66 detects the leading and trailing edges of a streak. In accordance with the detection result from the edge detector 66, a leading edge coordinate register 68 and a trailing edge coordinate register 70 store output horizontal coordinate values from a pixel counter 72 as the leading edge and the trailing edge coordinates, respectively. The pixel counter 72 and a line counter 74 together constitute the current coordinate extraction unit 50 described above. The pixel counter 72 counts the number of pixels in units of lines. The line counter 74 detects the coordinate value in the vertical direction of a line of interest.

The immediately preceding line data register 58 consists of four registers, Xmin Reg 76, Xmax Reg 78, Ymin Reg 80, and Ymax Reg 82, for temporarily storing the coordinate values of a circumscribed quadrilateral (temporary circumscribed quadrilateral) of a pattern which is extracted in the immediately preceding line of a line of interest.

The coordinate value comparator 48 has an Xmin comparator 84 and an Xmax comparator 86 for comparing the horizontal coordinate values of the temporary circumscribed quadrilateral of the immediately preceding line stored in the Xmin Reg 76 and the Xmax Reg 78 with the leading edge and the trailing edge coordinate values stored in the leading edge coordinate register 68 and the trailing edge coordinate register 70, respectively. Also, the adjacency determination unit 52 performs adjacency determination on the basis of the horizontal coordinate values of the temporary circumscribed quadrilateral of the immediately preceding line stored in the Xmin Reg 76 and the Xmax Reg 78 and the leading edge and the trailing edge coordinate values stored in the leading edge coordinate register 68 and the trailing edge coordinate register 70.

The data selector 60 is applied with the coordinate values from the immediately preceding line data register 58, the line counter 74, and the coordinate comparator 48, and selectively output these values in accordance with the determination result from the adjacency determination unit 52. That is, the data selector 60 consists of an Xmin selector 88, an Xmax selector 90, a Ymin selector 92, a Ymax selector 94, registers Reg 96 to 102, and a selector 104. The Xmin selector 88, the Xmax selector 90, the Ymin selector 92, and the Ymax selector 94 select a minimum horizontal coordinate Xmin, a maximum horizontal coordinate Xmax, a minimum vertical coordinate Ymin, and a maximum vertical coordinate Ymax, respectively, in accordance with the determination result from the adjacency determination unit 52. The registers Reg 96 to 102 store the output coordinate values from these selectors 88 to 94. The selector 104 sequentially outputs the coordinate values stored in the registers Reg 96 to 102 in accordance with an output from a work memory controller 106 corresponding to the memory controller 64 described above.

A temporary circumscribed quadrilateral number counter 108, a transfer counter 110, a temporary circumscribed quadrilateral read controller 112, a temporary circumscribed quadrilateral read counter 114, and an address selector 116 consisting of selectors 118 and 120 correspond to the address controller 62 described above. In accordance with the determination result from the adjacency determination unit 52, the temporary circumscribed quadrilateral number counter 108 counts the number of temporary circumscribed quadrilaterals present on a line of interest and supplies the count as an address to a work memory "1" 122 via the selector 118. Consequently, the coordinate values of circumscribed quadrilaterals extracted by the data selector 60 are stored in the work memory "1" 122. The transfer counter 110 supplies an address signal to the work memory "1" 122 and a work memory "2" 124 via the selectors 118 and 120, respectively, thereby transferring the data of the coordinate values of temporary circumscribed quadrilaterals from the work memory "1" 122 to the work memory "2" 124. On the basis of the coordinate values of a temporary circumscribed quadrilateral of the immediately preceding line currently stored in the Xmin Reg 76 and the Xmax Reg 78 of the immediately preceding line data register 58, the temporary circumscribed quadrilateral read controller 112 controls read of a temporary circumscribed quadrilateral present next to the temporary circumscribed quadrilateral currently stored in the immediately preceding line data register 58. Under the control of this temporary circumscribed quadrilateral read controller 112, the temporary circumscribed quadrilateral read counter 114 generates a read address of the work memory "2" 124, supplies the address via the selector 120, and transfers the coordinate values of the temporary circumscribed quadrilateral to the immediately preceding line data register 58.

A fixed circumscribed quadrilateral number counter 126 and a fixed circumscribed quadrilateral memory 128 correspond to the circumscribed quadrilateral extraction unit 24 described above. That is, the fixed circumscribed quadrilateral number counter 126 counts the number of circumscribed quadrilaterals of fixed patterns and supplies the count to the fixed circumscribed quadrilateral memory 128 as an address. In accordance with this address, the fixed circumscribed quadrilateral memory 128 stores the coordinate values of fixed circumscribed quadrilaterals extracted by the data selector 60.

Figure 20:
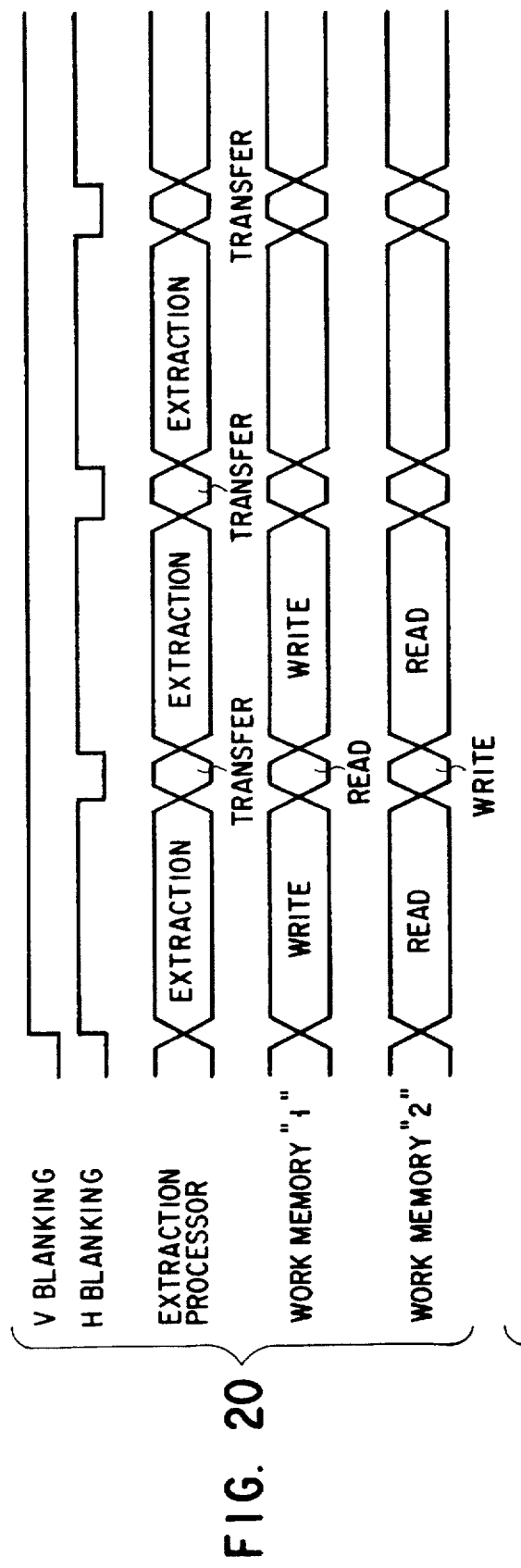
FIG. 20 is a timing chart showing the relationship between the operations of work memories and an extraction processor in the seventh embodiment.

The operation of the seventh embodiment will be described below. FIG. 20 is a timing chart showing the relationship between the operations of the work memories "1" 122 and "2" 124 and the extraction processor (from the processing data extraction unit 46 to the address selector 116). The processing data extraction unit 46 extracts only data (streak) having a run length of a certain number (n) or more of "1"s or "0"s from input binary image data. To extract the horizontal coordinate values of the leading and trailing edges of this streak, the coordinate value extraction unit 48 performs the coordination value detection processing described previously. The coordinate values detected by the coordinate value extraction unit 48 and the horizontal coordinate values of a temporary circumscribed quadrilateral extracted in the immediately preceding line are supplied to the adjacency determination unit 52. The adjacency determination unit 52 checks whether the streak of the line of interest is adjacent to the temporary circumscribed quadrilateral of the immediately preceding line.

If data (coordinate values) of the temporary circumscribed quadrilateral of the immediately preceding line is present and there is no streak of the line of interest (no adjacency), the coordinate values of the temporary circumscribed quadrilateral of the immediately preceding line are considered as fixed values. Accordingly, the coordinate values of the temporary circumscribed quadrilateral stored in the immediately preceding line data register 58 are selected by the data selector 60 and written in the fixed circumscribed quadrilateral memory 128. Also, the value of the fixed circumscribed quadrilateral number counter 126 is incremented by +1.

On the other hand, if a streak of the line of interest is present and not adjacent to the temporary circumscribed quadrilateral of the immediately preceding line, a temporary circumscribed quadrilateral having the horizontal coordinate values detected by the coordinate value extraction unit 48, as the maximum and minimum horizontal coordinate values, and the output values from the line counter 74, as the maximum and minimum vertical coordinate values, is stored in the work memory "1" 122.

If the streak of the line of interest is adjacent to the temporary circumscribed quadrilateral of the immediately preceding line, the coordinate value comparator 48 so controls the data selector 60 as to select a smaller one of the minimum horizontal coordinate values and a larger one of the maximum horizontal coordinate values of the streak and the temporary circumscribed quadrilateral of the immediately preceding line. The data selector 60 also selects the output values from the line counter 74 as the minimum and maximum vertical coordinate values of the temporary circumscribed quadrilateral. These selected values are stored in the work memory "1" 122 as the coordinate values of the temporary circumscribed quadrilateral, and the temporary circumscribed quadrilateral number counter 108 is incremented by +1.

The above processing is executed for an image effective period in one line. Thereafter, in the image blanking period (H blanking period) the coordinate values of the temporary circumscribed quadrilateral stored in the work memory "1" 122 are transferred from the work memory "1" 122 to the work memory "2" 124. In this transfer the address selector 116 selects the output value from the transfer counter 110 so that the data are arranged by the same mapping in the work memories "1" 122 and "2" 124. The above processing is performed for each line. By repeating the same processing for one vertical period it is possible to accurately obtain a circumscribed quadrilateral of a pattern as illustrated in FIG. 21. The temporary circumscribed quadrilateral number counter 108 is initialized for each horizontal period. The data of this temporary circumscribed quadrilateral number counter 108 immediately before initialization is read into the transfer counter 110 and the temporary circumscribed quadrilateral read counter 114 and thereby reflected on processing of the next line.

If the temporary circumscribed quadrilateral extracted in the immediately preceding line is not adjacent to the streak of the line of interest, the coordinate values of the temporary circumscribed quadrilateral are read out when the maximum horizontal coordinate value of the readout coordinate values exceeds the horizontal coordinate value of the line of interest. If the temporary circumscribed quadrilateral extracted in the immediately preceding line is adjacent to the streak of the line of interest, a temporary circumscribed quadrilateral existing next is read out in a region where neither a streak nor a temporary circumscribed quadrilateral is present.

If a plurality of temporary circumscribed quadrilaterals are adjacent to a streak, each time the horizontal coordinate values of the line of interest exceed the maximum horizontal coordinate value of the first temporary circumscribed quadrilateral, a new circumscribed quadrilateral is formed by using a smaller one of the minimum vertical coordinate values of the first and second temporary circumscribed quadrilaterals as the minimum vertical coordinate value, the maximum horizontal coordinate value of the second temporary circumscribed quadrilateral as the maximum horizontal coordinate value, and the minimum horizontal coordinate value of the first temporary circumscribed quadrilateral as the minimum horizontal coordinate value, and this new circumscribed quadrilateral is stored in the immediately preceding line data register 58. Consequently, even in a case like this a circumscribed quadrilateral of a specific pattern can be extracted.

In this embodiment, data of a temporary circumscribed quadrilateral is transferred between the work memories during the horizontal blanking period. Accordingly, during the image effective period it is only necessary to perform the same processing for each horizontal period, and this simplifies the internal configuration of the apparatus. Also, since the count of temporary circumscribed quadrilaterals extracted in a line of interest is initialized for each horizontal period, the number of streaks of the line of interest need only be taken into consideration with respect to the label value of a temporary circumscribed quadrilateral. Consequently, the scale of the counter for counting temporary circumscribed quadrilaterals can be reduced. Additionally, since no labeling processing or the like needs to be performed, a circumscribed quadrilateral of a specific pattern in one frame can be extracted in real time during one vertical period. Furthermore, even if there is an oblique defect on a specific pattern as illustrated in FIG. 5, a circumscribed quadrilateral of an intended pattern can be extracted by similarly performing adjacency determination and comparison between a streak and a temporary circumscribed quadrilateral extracted in the immediately preceding line.

Figure 22A:
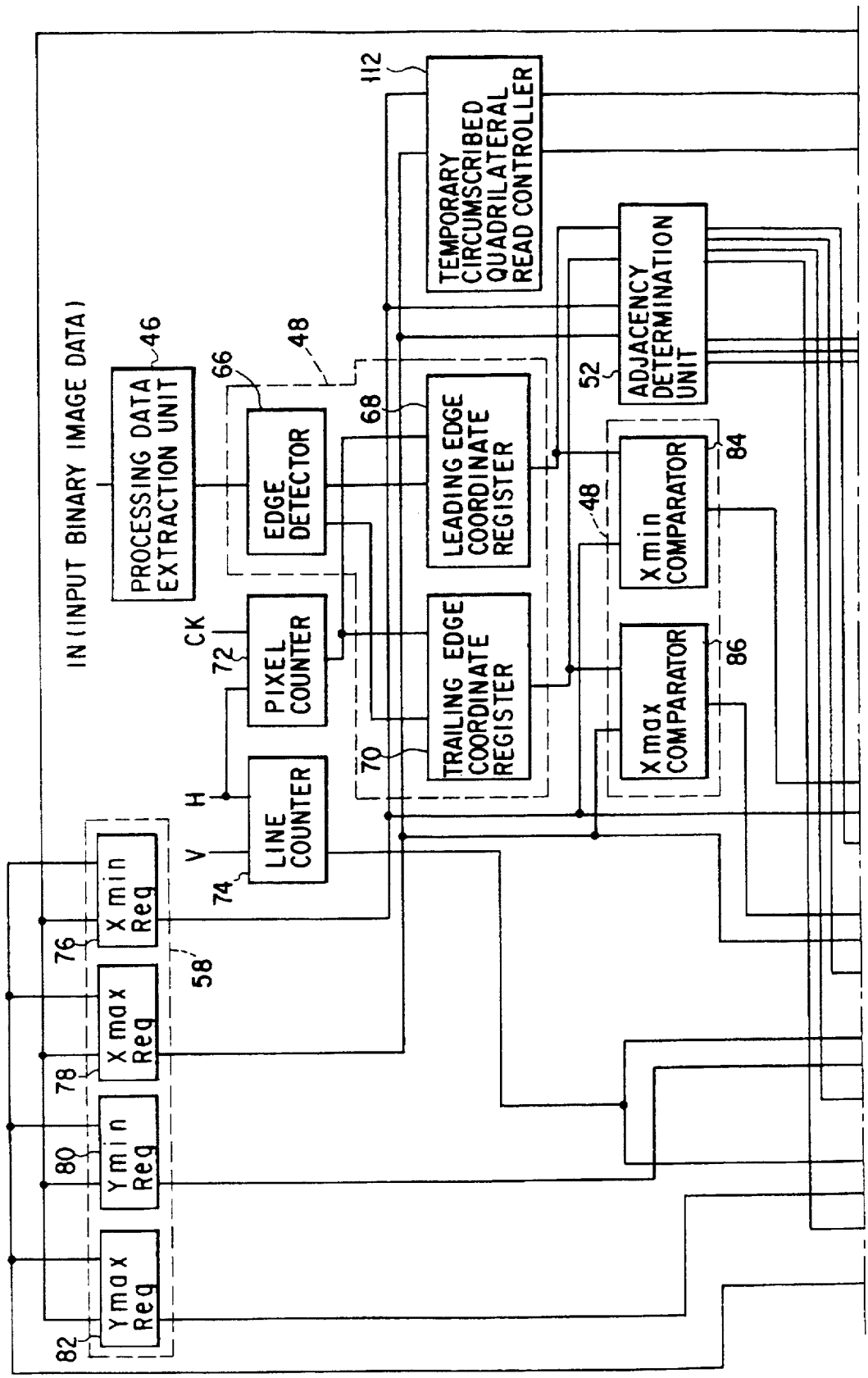

The eighth embodiment of the present invention will be described below. FIGS. 22A and 22B are block diagrams of this embodiment. In this embodiment, the address selector 116 is constituted by one selector 130 by omitting the transfer counter 110, and data is complementarily written in/read out from a work memory "1" 122 and a work memory "2" 124. For this purpose, a read/write (R/W) signal to be supplied to the work memory "1" 122 is inverted by an inverter 132 and supplied to the work memory "2" 124 as an R/W signal. A selector 134 also is provided so that the data is alternately supplied from the work memories "1" 122 and "2" 124 to an immediately preceding line data register 58.

Figure 23:
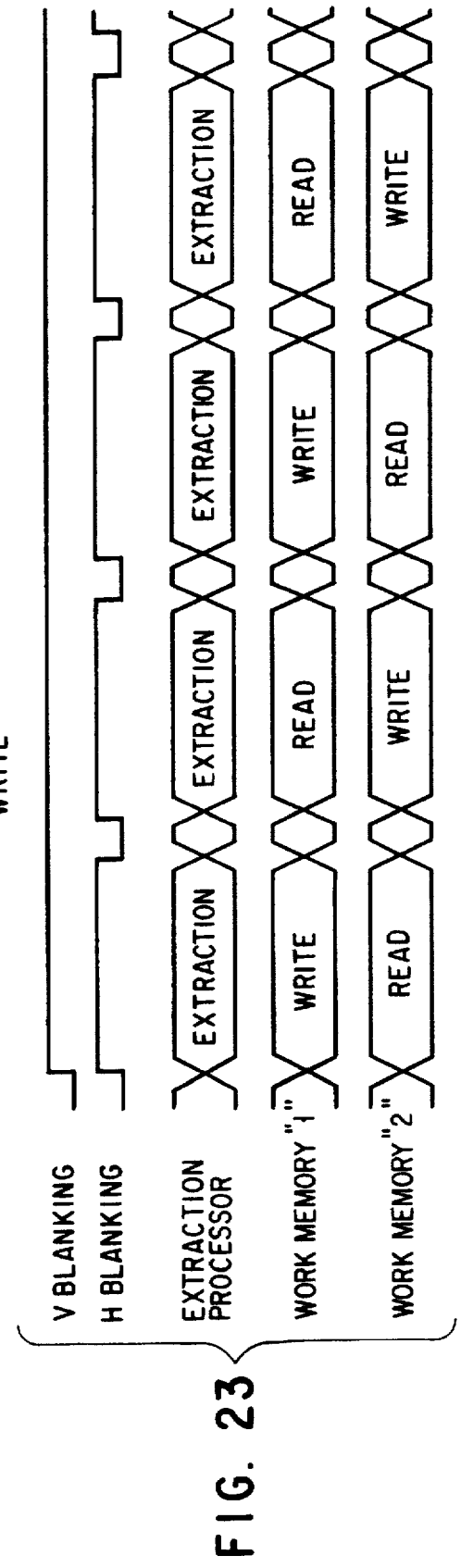
FIG. 23 is a timing chart showing the relationship between the operations of work memories and an extraction processor in the eighth embodiment.

That is, although this embodiment is so designed as to perform similar processing as in the seventh embodiment, the embodiment differs from the seventh embodiment in that, as illustrated in FIG. 23, the functions of the work memories "1" 122 and "2" 124 are switched in units of lines. In this eighth embodiment, as in FIG. 23, while the coordinate values of a temporary circumscribed quadrilateral extracted in a line of interest are stored in the work memory "1" 122, the coordinate values of a temporary circumscribed quadrilateral extracted in the immediately preceding line are read out from the work memory "2" 124. On the next line, the selector 130 switches the storage processing and the read processing of the work memories "1" 122 and "2" 124. Consequently, a circumscribed quadrilateral of a specific pattern can be extracted in the same manner as in the seventh embodiment.

In this embodiment, the functions of the work memories are switched in units of lines. This decreases the limit on the number of temporary circumscribed quadrilaterals capable of being extracted, compared to the seventh embodiment in which the coordinate values of a temporary circumscribed quadrilateral extracted in the immediately preceding line are transferred between the work memories during the horizontal blanking period. Consequently, the processing can be reliably performed even if a large number of temporary circumscribed quadrilaterals are present in one line.

Figure 24:
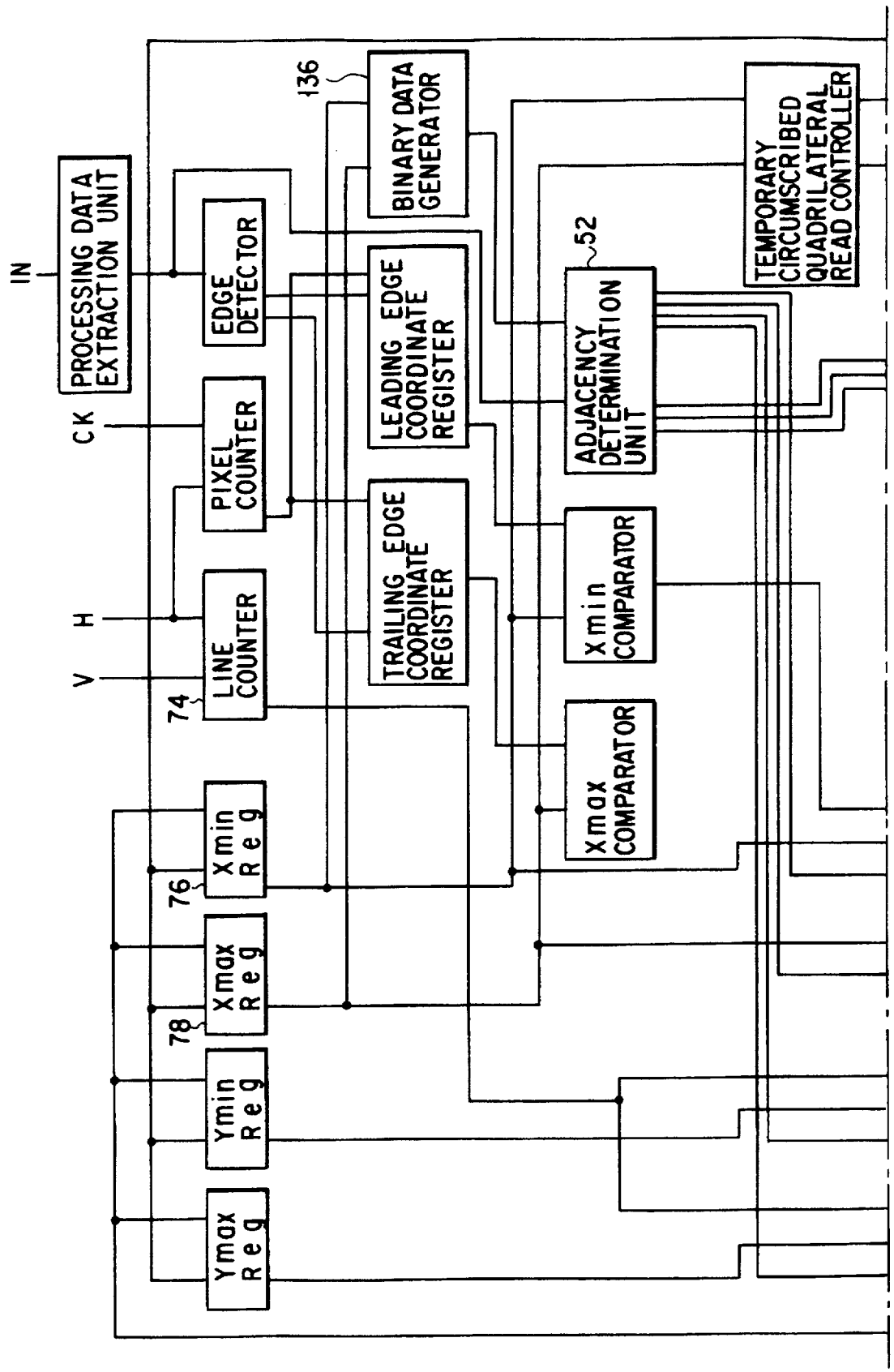
FIG. 24 is a block diagram showing the ninth embodiment of the present invention.

The ninth embodiment of the present invention will be described below. FIG. 24 is a block diagram showing this embodiment and corresponds to FIG. 22A of the eighth embodiment. The ninth embodiment further includes, in addition to the configuration of the eighth embodiment, a binary data generator 136 for extracting binary data from the horizontal coordinate values of a temporary circumscribed quadrilateral, which are stored in and read out from a work memory and stored in Xmin Reg 76 and Xmax Reg 78 of an immediately preceding line data register 58.

That is, this binary data generator 136 obtains binary data from the horizontal coordinate values of a temporary circumscribed quadrilateral stored in the immediately preceding line data register 58. This binary data and a streak of a line of interest are applied to an adjacency determination unit 52 which checks adjacency between them. If the adjacency determination unit 52 determines that the streak and the binary data are adjacent to each other, the horizontal coordinate values of the streak and the horizontal coordinate values of the temporary circumscribed quadrilateral are compared to extract the coordinate values of a new temporary circumscribed quadrilateral. The extracted coordinate values are stored in the work memory. If binary data generated from a temporary circumscribed quadrilateral of the immediately preceding line is present and there is no streak of a line of interest, the coordinate values of the temporary circumscribed quadrilateral described above are stored in a fixed circumscribed quadrilateral memory 128 as fixed values. If only a streak of a line of interest exists, the values of a line counter 74 and the coordinate values of the leading and trailing edges of the streak are stored in the work memory as the vertical coordinate values and the horizontal coordinate values, respectively, of a new temporary circumscribed quadrilateral. A circumscribed quadrilateral of a specific pattern can be extracted by performing this processing for one vertical period for each horizontal period.

This embodiment is so designed as to check adjacency between a streak of a line of interest and binary data generated from the coordinate values of a temporary circumscribed quadrilateral of the immediately preceding line. That is, adjacency determination is done between the binary data. Accordingly, the adjacency determination unit 52 can be constituted by simple circuits such as AND gates, and this reduces the scale of the apparatus.

Figure 25:
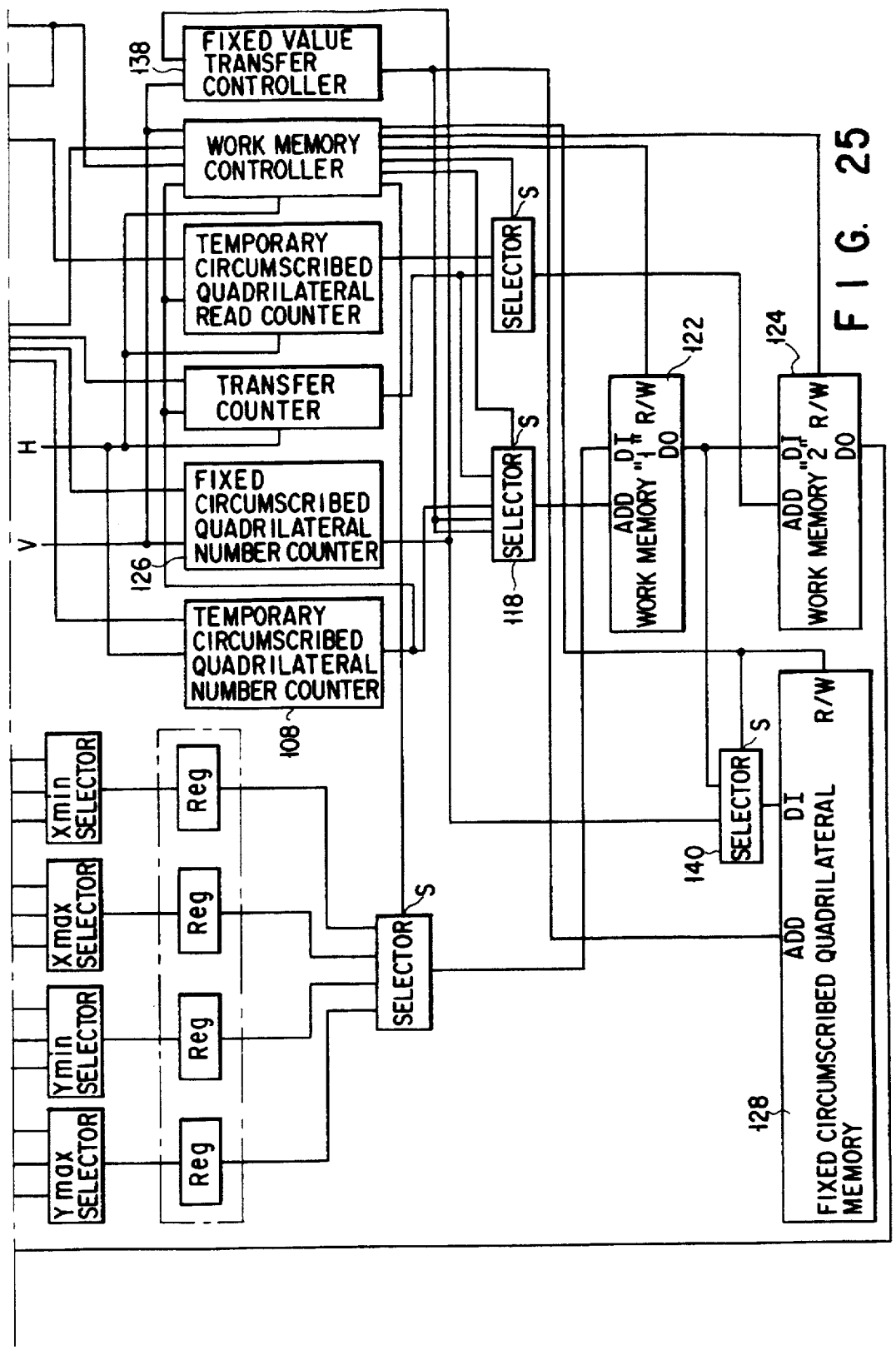
FIG. 25 is a block diagram showing the tenth embodiment of the present invention.

The tenth embodiment of the present invention will be described below. FIG. 25 is a block diagram showing this tenth embodiment, in which a fixed value transfer controller 138 and a selector 140 are further provided in the configuration of the seventh embodiment as shown in FIG. 19B. An output from the fixed value transfer controller 138 is supplied to a selector 118 and to a fixed circumscribed quadrilateral memory 128 as an address signal. An output from a fixed circumscribed quadrilateral number counter 126 is supplied to the selectors 118 and 140, and an output from a selector 104 is stored in a work memory "1" 122. That is, to store the coordinate values of a fixed circumscribed quadrilateral in the fixed circumscribed quadrilateral memory 128 during the vertical blanking period, under the control of the fixed value transfer controller 138 the coordinate values of the fixed circumscribed quadrilateral are stored in the fixed circumscribed quadrilateral memory 128 via the work memory "1" 122 and the selector 140. In the seventh to ninth embodiments described previously, the work memory "1" 122 merely stores the coordinate values of a temporary circumscribed quadrilateral. In the work memory "1" 122 of this embodiment, however, as illustrated in FIG. 26, a fixed data area 144 for storing the coordinate values of a fixed circumscribed quadrilateral is provided in addition to a temporary data area 142 for storing the coordinate values of a temporary circumscribed quadrilateral.

In the tenth embodiment with the above configuration, input binary image data is decomposed into streaks, and adjacency between each streak and a temporary circumscribed quadrilateral of the immediately preceding line read out from a work memory "2" 124 is checked. If the adjacency is found, a new temporary circumscribed quadrilateral is extracted by comparing the coordinate values and stored in the temporary data area 142 of the work memory "1" 122. If only a streak of a line of interest exists, a temporary circumscribed quadrilateral of the streak is extracted on the basis of the coordinate values of the leading and trailing edges of the streak and an output value from a line counter 74 and stored in the temporary data area 142 of the work memory "1" 122. On the other hand, if only a temporary circumscribed quadrilateral of the immediately preceding line is present, the coordinate values of this temporary circumscribed quadrilateral are stored in the fixed data area of the work memory "1" 122. This processing is performed for one horizontal effective period.

In the horizontal blanking period, the coordinate values of a temporary circumscribed quadrilateral stored in the temporary data area 142 of the work memory "1" 122 in the immediately preceding horizontal effective period are transferred to the work memory "2" 124. This processing is done for one vertical effective period for each horizontal period, and the fixed circumscribed quadrilateral number counter 126 is initialized. In the vertical blanking period, the coordinate values of a fixed circumscribed quadrilateral stored in the fixed data area of the work memory "1" 122 in the immediately preceding vertical effective period are transferred to the fixed circumscribed quadrilateral memory 128. During the transfer the value of the fixed circumscribed quadrilateral number counter 126 immediately before initialization also is stored in a specific address of the fixed circumscribed quadrilateral memory 128. Consequently, the subsequent processing can be informed of the number of extracted circumscribed quadrilaterals. A circumscribed quadrilateral of a specific pattern can be extracted by performing the above processing for one vertical period.

In this embodiment, the coordinate values of both a temporary circumscribed quadrilateral and a fixed circumscribed quadrilateral are stored in the work memory "1" 122. Therefore, the memory can be effectively used and this decreases the number of pins when the apparatus is manufactured by using ICs. Also, since a memory for finally storing the coordinate values of a fixed circumscribed quadrilateral is provided, the subsequent processing can be performed in a pipeline manner, and this avoids overlapping to processing of the next frame. Additionally, the number of extracted circumscribed quadrilaterals also is output to previously inform the subsequent processing of the number of necessary data. This allows an easy process configuration in the subsequent stage.

The present invention has been described above on the basis of its preferred embodiments, but the invention is not limited to these embodiments. That is, various modifications and applications of the present invention are possible without departing from the gist of the invention. As an example, a circumscribed polygon can be used instead of a circumscribed quadrilateral.

The gist of the present invention is as follows.

(1) An image processing apparatus comprising specific object extracting means for extracting a specific object, which is previously defined by a predetermined shape as an object to be extracted, from an image including the specific object, and circumscribed quadrilateral setting means for setting a circumscribed quadrilateral of the specific object extracted by the specific object extracting means, wherein the specific object extracting means includes streak extracting means which, when a run length in a raster direction of input binary image data is within a predetermined range, extracts a binary data string having a run length within the predetermined range as a streak constituting a part of the specific object, and the circumscribed quadrilateral setting means sets a circumscribed quadrilateral for an aggregate of streaks sequentially extracted by the streak extracting means.

In this apparatus, the existing range of a known specific object, e.g., a marker in a dot code, can be extracted only from the run length of the marker by using information pertaining to the size of the marker. This obviates the need for a frame memory or the like device and makes high-speed processing possible.

Additionally, since the streak extracting means extracts only the run length in a predetermined range, the amount of arithmetic operations in the circumscribed quadrilateral setting means is reduced.

(2) The image processing apparatus described in item (1) above, wherein the circumscribed quadrilateral setting means sets a circumscribed quadrilateral including each of streaks sequentially extracted by the streak extracting means, in accordance with adjacency of the streak with respect to other streaks or to a circumscribed quadrilateral formed on the basis of an aggregate of other streaks.

In this apparatus, a streak aggregate is formed such that adjacent streaks or aggregates of streaks are integrated or concatenated. Accordingly, even a specific object having a defect like an oblique line can be processed as one object without being divided.

(3) The image processing apparatus described in item (1) above, wherein the specific object extracting means further includes attribute data generating/storing means which, when a streak extracted by the streak extracting means is adjacent to a previously extracted streak or to a circumscribed quadrilateral based on a previously formed streak aggregate, forms a streak aggregate including the streak, and generates and stores attribute data for specifying a circumscribed quadrilateral to be set for the streak aggregate, and the circumscribed quadrilateral setting means sets a circumscribed quadrilateral including a streak extracted by the streak extracting means, when the extracted streak is adjacent to a previously extracted streak or to a circumscribed quadrilateral set on the basis of the attribute data of the attribute data generating/storing means.

In this apparatus, each streak aggregate has a memory for storing information of a circumscribed quadrilateral formed by the streak aggregate. Therefore, a circumscribed quadrilateral can be fixed when it is determined that there is no more streak adjacent to each streak aggregate.

Also, adjacency determination can be performed with a simple configuration since the determination is performed only from attribute data.

(4) The image processing apparatus described in item (1) above, wherein the specific object extracting means further includes attribute data generating/storing means which, when a streak extracted by the streak extracting means is adjacent to a previously extracted streak or to a circumscribed quadrilateral based on a previously formed streak aggregate and when at least one of a length of the extracted streak, a length of the previously extracted streak, and a length of the circumscribed quadrilateral based on the previously formed streak aggregate is equal to or larger than a predetermined threshold, forms a streak aggregate including the streak, and generates and stores attribute data for specifying a circumscribed quadrilateral to be set for the streak aggregate, and the circumscribed quadrilateral setting means sets a circumscribed quadrilateral including a streak extracted by the streak extracting means, when the extracted streak is adjacent to a previously extracted streak or to a circumscribed quadrilateral set on the basis of the attribute data of the attribute data generating/storing means and when at least one of a length of the extracted streak, a length of the previously extracted streak, and a length of the circumscribed quadrilateral based on the attribute data is equal to or larger than the predetermined threshold.

In this apparatus, a streak which is short to some extent also is processed as a streak constituting a part of an object by using a streak having a run length within a predetermined range. However, if this streak is not in contact with a streak or streak aggregate having a sufficiently large length, this streak is not processed as a part of an object. Consequently, an object consisting of a streak aggregate, such as noise, having a relatively small run length, is not processed as a specific object. This reduces erroneous detection in the specific object extraction.

(5) The image processing apparatus described in item (1) above, wherein the specific object extracting means further includes attribute data generating/storing means which, when a streak extracted by the streak extracting means is adjacent to a previously extracted streak or to a circumscribed quadrilateral based on a previously formed streak aggregate, forms a streak aggregate including the streak, and generates and stores attribute data for specifying a circumscribed quadrilateral to be set for the streak aggregate, determining means for determining whether a length or height of a circumscribed quadrilateral based on the attribute data of the attribute data generating/storing means is equal to or larger than a predetermined length or height, and means for setting the streak aggregate as a non-specific object when the determining means determines that the length or height of the circumscribed quadrilateral is equal to or larger than the predetermined length or height.

In this apparatus, erroneous detection can be further reduced by determining if a streak aggregate has dimensions equivalent to the dimensions of an object in the vertical and horizontal directions.

(6) The image processing apparatus described in item (1) above, wherein the specific object extracting means further includes determining means which, when a streak extracted by the streak extracting means is adjacent to a previously extracted streak or to a circumscribed quadrilateral based on a previously formed streak aggregate, forms a streak aggregate including the streak and determines whether a length between two ends or height of the streak aggregate is equal to or larger than a predetermined length or height, and means for setting the streak aggregate as a non-specific object when the determining means determines that the length between two ends or height of the streak aggregate is equal to or larger than the predetermined length or height.

In this apparatus, if the vertical or horizontal dimension of a streak aggregate is much larger than that of a specific object, this streak aggregate is detected to be noise, and this further reduces erroneous detection.

(7) The image processing apparatus described in item (1) above, wherein the specific object extracting means further includes attribute data generating/storing means which, when all of a plurality of streaks extracted by the streak extracting means are adjacent to a previously extracted streak or to a circumscribed quadrilateral based on a previously formed streak aggregate, forms a streak aggregate including the streaks, and generates and stores attribute data for specifying a circumscribed quadrilateral to be set for the streak aggregate, and the circumscribed quadrilateral setting means sets a circumscribed quadrilateral including a plurality of streaks extracted by the streak extracting means, when all of the extracted streaks are adjacent to a previously extracted streak or to a circumscribed quadrilateral set on the basis of the attribute data of the attribute data generating/storing means.

In this apparatus, a specific object can be processed as one object even if a streak is disconnected due to the presence of a defect.

Also, if one attribute data is adjacent to a plurality of streaks, new attribute data is generated from one attribute data and one temporary attribute data. Consequently, the amount of arithmetic operations can be reduced.

(8) The image processing apparatus described in item (1) above, wherein the specific object extracting means further includes attribute data generating/storing means which, when a streak extracted by the streak extracting means is adjacent to all of a plurality of previously extracted streaks or to all of a plurality of circumscribed quadrilaterals based on a plurality of previously formed streak aggregates, forms a streak aggregate including the streak, and generates and stores attribute data for specifying a circumscribed quadrilateral to be set for the streak aggregate, and the circumscribed quadrilateral setting means sets circumscribed quadrilaterals for all adjacent components including a streak extracted by the streak extracting means, when the extracted streak is adjacent to all of a plurality of previously extracted streaks or to all of a plurality of circumscribed quadrilaterals set on the basis of the attribute data of the attribute data generating/storing means.

In this apparatus, a specific object can be processed as one object even if a streak is disconnected due to the presence of a defect.

Also, if one streak is adjacent to a plurality of attribute data, one attribute data is generated by updating these attribute data and compared with the streak to generate new attribute data. In this manner the amount of arithmetic operations can be reduced.

(9) An image processing apparatus comprising specific object extracting means for extracting a specific object, which is previously defined by a predetermined shape as an object to be extracted, from an image including the specific object, and circumscribed quadrilateral setting means for setting a circumscribed quadrilateral of the specific object extracted by the specific object extracting means, wherein the specific object extracting means includes streak extracting means which, when a run length in a raster direction of input binary image data is equal to or larger than a first threshold, extracts a binary data string having a run length equal to or larger than the first threshold as a streak constituting a part of the specific object, and attribute data generating/storing means which, when a streak extracted by the streak extracting means is adjacent to a previously extracted streak or to a circumscribed quadrilateral based on a previously formed streak aggregate and when a length of the extracted streak is equal to or larger than a second threshold which is larger than the first threshold, substitutes the extracted streak with a streak equal to a length of the previously extracted streak or a length of the circumscribed quadrilateral based on the previously formed streak aggregate, forms a streak aggregate including the substitute streak, and generates and stores attribute data for specifying a circumscribed quadrilateral to be set for the streak aggregate, and the circumscribed quadrilateral setting means sets a circumscribed quadrilateral including the substitute streak of a streak extracted by the streak extracting means, when the extracted streak is adjacent to a previously extracted streak or to a circumscribed quadrilateral set on the basis of the attribute data of the attribute data generating/storing means and when a length of the extracted streak is equal to or larger than the second threshold.

In this apparatus, even if a streak having a very large length is generated by defects or dirt, processing is continued by substituting this streak with a most probable streak. Consequently, it is possible to reduce extraction errors of objects caused by defects or dirt.

(10) An image processing apparatus comprising a processing data extraction unit for receiving a binary image signal obtained by raster-scanning an image and removing unnecessary data by detecting a black or white run length, an adjacency determination unit for checking a connection relationship between data obtained by the processing data extraction unit and a temporary circumscribed quadrilateral of a pattern extracted in an immediately preceding line, a comparator for comparing edge coordinates of the data obtained by the processing data extraction unit with edge coordinates of the temporary circumscribed quadrilateral, a temporary circumscribed quadrilateral counter for counting the number of temporary circumscribed quadrilaterals, a fixed circumscribed quadrilateral counter for counting the number of fixed circumscribed quadrilaterals, a line counter for counting lines, a pixel counter for counting pixels in units of lines, a plurality of work memories for storing temporary circumscribed quadrilaterals, and control means for transferring the coordinate values of the temporary circumscribed quadrilateral between the work memories during a horizontal blanking period, and causing at least one of the work memories to execute write processing during an image effective period.

In this apparatus, since labeling processing or the like is unnecessary, processing can be performed during one frame period, i.e., real-time processing is possible. Also, the coordinate values of temporary circumscribed quadrilaterals are transferred between the work memories during the horizontal blanking period. Accordingly, during the image effective period the same processing need only be performed for each horizontal period. This simplifies the configuration of the apparatus.

(11) The image processing apparatus described in item (10) above, further comprising means for generating binary data in a horizontal direction on the basis of the coordinate values of a temporary circumscribed quadrilateral stored in the work memories.

This apparatus includes means for generating binary data in a horizontal direction on the basis of the coordinate values of a temporary circumscribed quadrilateral stored in the work memories. Since adjacency determination is performed between the binary data, the adjacency determination unit can be constituted by simple circuits such as AND gates. Consequently, the scale of the apparatus can be reduced.

(12) The image processing apparatus described in item (10) above, wherein the temporary circumscribed quadrilateral counter counts the number of temporary circumscribed quadrilaterals in units of lines, and the count is always started from an initial value in each line.

In this apparatus, the number of temporary circumscribed quadrilaterals is counted in units of lines, and the count is always started from an initial value in each line. Accordingly, only the number of streaks of a line of interest needs to be taken into consideration with respect to the label of a temporary circumscribed quadrilateral. Consequently, the scale of the counter can be reduced.

(13) An image processing apparatus comprising a processing data extraction unit for receiving a binary image signal obtained by raster-scanning an image and removing unnecessary data by detecting a black or white run length, an adjacency determination unit for checking a connection relationship between data obtained by the processing data extraction unit and a temporary circumscribed quadrilateral of a pattern extracted in an immediately preceding line, a comparator for comparing edge coordinates of the data obtained by the processing data extraction unit with edge coordinates of the temporary circumscribed quadrilateral, a temporary circumscribed quadrilateral counter for counting the number of temporary circumscribed quadrilaterals, a fixed circumscribed quadrilateral counter for counting the number of fixed circumscribed quadrilaterals, a line counter for counting lines, a pixel counter for counting pixels in units of lines, a plurality of work memories for storing temporary circumscribed quadrilaterals, and means for using the work memories while switching write processing and read processing of the work memories.

This apparatus can perform real-time processing. Additionally, the limit on the number of temporary circumscribed quadrilaterals capable of being extracted is decreased. Therefore, even if a large number of temporary circumscribed quadrilaterals are present in one line, processing can be reliably performed.

(14) The image processing apparatus described in item (13) above, wherein the temporary circumscribed quadrilateral counter counts the number of temporary circumscribed quadrilaterals in units of lines, and the count is always started from an initial value in each line.

In this apparatus, the number of temporary circumscribed quadrilaterals is counted in units of lines, and the count is always started from an initial value in each line. Accordingly, only the number of streaks of a line of interest needs to be taken into consideration with respect to the label of a temporary circumscribed quadrilateral. Consequently, the scale of the counter can be reduced.

(15) An image processing apparatus comprising a processing data extraction unit for receiving a binary image signal obtained by raster-scanning an image and removing unnecessary data by detecting a black or white run length, an adjacency determination unit for checking a connection relationship between data obtained by the processing data extraction unit and a temporary circumscribed quadrilateral of a pattern extracted in an immediately preceding line, a comparator for comparing edge coordinates of the data obtained by the processing data extraction unit with edge coordinates of the temporary circumscribed quadrilateral, a temporary circumscribed quadrilateral counter for counting the number of temporary circumscribed quadrilaterals, a fixed circumscribed quadrilateral counter for counting the number of fixed circumscribed quadrilaterals, a line counter for counting lines, a pixel counter for counting pixels in units of lines, and a plurality of work memories, wherein coordinate values of a temporary circumscribed quadrilateral and a fixed circumscribed quadrilateral are stored in one of the work memories.

This apparatus can perform real-time processing. Additionally, one of the work memories stores the coordinate values of a temporary circumscribed quadrilateral and a fixed circumscribed quadrilateral. Accordingly, the memories can be effectively used and the number of pins can be decreased when the apparatus is manufactured by using ICs.

(16) The image processing apparatus described in item (15) above, wherein the temporary circumscribed quadrilateral counter counts the number of temporary circumscribed quadrilaterals in units of lines, and the count is always started from an initial value in each line.

In this apparatus, the number of temporary circumscribed quadrilaterals is counted in units of lines, and the count is always started from an initial value in each line. Accordingly, only the number of streaks of a line of interest needs to be taken into consideration with respect to the label of a temporary circumscribed quadrilateral. Consequently, the scale of the counter can be reduced.

(17) The image processing apparatus described in item (15) above, further comprising a fixed data memory for storing coordinate values of a fixed circumscribed quadrilateral, and means for transferring the coordinate values of a fixed circumscribed quadrilateral from the work memory to the fixed data memory during a vertical blanking period.

This apparatus includes a fixed data memory for storing the coordinate values of a fixed circumscribed quadrilateral, and the coordinate values of a fixed circumscribed quadrilateral are transferred from the work memory to the fixed data memory during a vertical blanking period. Therefore, it is possible to avoid overlapping to processing of the next frame. Consequently, the subsequent processing can be performed in a pipeline manner without performing any complicated control.

(18) The image processing apparatus described in item (15) above, further comprising means for outputting coordinate values of fixed circumscribed quadrilaterals and the number of the fixed circumscribed quadrilaterals.

In this apparatus, the coordinate values of fixed circumscribed quadrilaterals and the number of the fixed circumscribed quadrilaterals are output. Accordingly, it is possible to previously inform the number of data necessary in processing in the subsequent stage. This allows an easy process configuration in the subsequent stage.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A code pattern-image processing apparatus comprising:

specific object extracting means for extracting a marker from a two-dimensional code pattern-image including the marker and a data area in which a plurality of dots are arranged in association with recording data, said marker having a predetermined size and being located to determine a read reference point for use in reading the plurality of dots; and circumscribed quadrilateral setting means for setting a circumscribed quadrilateral of the marker extracted by said specific object extracting means, wherein said specific object extracting means includes streak extracting means which, when a run length in a raster direction of input binary image data is within a predetermined range, extracts a binary data string having a run length within the predetermined range as a streak constituting a part of the specific object, and wherein said circumscribed quadrilateral setting means sets a circumscribed quadrilateral including each streak sequentially extracted by said streak extracting means, in accordance with a positional relationship of each streak with respect to other streaks or to a circumscribed quadrilateral formed based on an aggregate of the other streaks.

2. The image processing apparatus according to claim 1, wherein said specific object extracting means further includes attribute data generating/storing means which, when a streak extracted by said streak extracting means is adjacent to a previously extracted streak or to a circumscribed quadrilateral based on a previously formed streak aggregate, forms a streak aggregate including the streak, and generates and stores attribute data for specifying a circumscribed quadrilateral to be set for the streak aggregate, and said circumscribed quadrilateral setting means sets a circumscribed quadrilateral including a streak extracted by said streak extracting means, when the extracted streak is adjacent to a previously extracted streak or to a circumscribed quadrilateral set on the basis of the attribute data of said attribute data generating/storing means.

3. The image processing apparatus according to claim 1, wherein said specific object extracting means further includes:

attribute data generating/storing means which, when a streak extracted by said streak extracting means is adjacent to a previously extracted streak or to a circumscribed quadrilateral based on a previously formed streak aggregate, forms a streak aggregate including the streak, and generates and stores attribute data for specifying a circumscribed quadrilateral to be set for the streak aggregate;

determining means for determining whether a length or height of a circumscribed quadrilateral based on the attribute data of said attribute data generating/storing means is not less than a predetermined length or height; and means for setting the streak aggregate as a non-specific object when said determining means determines that the length or height of the circumscribed quadrilateral is not less than the predetermined length or height.

4. The image processing apparatus according to claim 1, wherein said specific object extracting means further includes:

determining means which, when a streak extracted by said streak extracting means is adjacent to a previously extracted streak or to a circumscribed quadrilateral based on a previously formed streak aggregate, forms a streak aggregate including the streak and determines whether a length between two ends or height of the streak aggregate is not less than a predetermined length or height; and means for setting the streak aggregate as a non-specific object when said determining means determines that the length between two ends or height of the streak aggregate is not less than the predetermined length or height.

5. The image processing apparatus according to claim 1, wherein said specific object extracting means further includes attribute data generating/storing means which, when all of a plurality of streaks extracted by said streak extracting means are adjacent to a previously extracted streak or to a circumscribed quadrilateral based on a previously formed streak aggregate, forms a streak aggregate including the streaks, and generates and stores attribute data for specifying a circumscribed quadrilateral to be set for the streak aggregate, and said circumscribed quadrilateral setting means sets a circumscribed quadrilateral including a plurality of streaks extracted by said streak extracting means, when all of the extracted streaks are adjacent to a previously extracted streak or to a circumscribed quadrilateral set on the basis of the attribute data of said attribute data generating/storing means.

6. The image processing apparatus according to claim 1, wherein said specific object extracting means further includes attribute data generating/storing means which, when a streak extracted by said streak extracting means is adjacent to all of a plurality of previously extracted streaks or to all of a plurality of circumscribed quadrilaterals based on a plurality of previously formed streak aggregates, forms a streak aggregate including the streak, and generates and stores attribute data for specifying a circumscribed quadrilateral to be set for the streak aggregate, and said circumscribed quadrilateral setting means sets circumscribed quadrilaterals for all adjacent components including a streak extracted by said streak extracting means, when the extracted streak is adjacent to all of a plurality of previously extracted streaks or to all of a plurality of circumscribed quadrilaterals set on the basis of the attribute data of said attribute data generating/storing means.

7. An image processing apparatus comprising:

specific object extracting means for extracting a specific object, which is previously defined by a predetermined shape as an object to be extracted, from an image including the specific object; and circumscribed quadrilateral setting means for setting a circumscribed quadrilateral of the specific object extracted by said specific object extracting means, wherein said specific object extracting means includes:

streak extracting means which, when a run length in a raster direction of input binary image data is not less than a first threshold, extracts a binary data string having a run length not less than the first threshold as a streak constituting a part of the specific object; and attribute data generating/storing means which, when a streak extracted by said streak extracting means is adjacent to a previously extracted streak or to a circumscribed quadrilateral based on a previously formed streak aggregate and when a length of the extracted streak is not less than a second threshold larger than the first threshold, substitutes the extracted streak with a streak equal to a length of the previously extracted streak or a length of the circumscribed quadrilateral based on the previously formed streak aggregate, forms a streak aggregate including the substitute streak, and generates and stores attribute data for specifying a circumscribed quadrilateral to be set for the streak aggregate, and said circumscribed quadrilateral setting means sets a circumscribed quadrilateral including the substitute streak of a streak extracted by said streak extracting means, when the extracted streak is adjacent to a previously extracted streak or to a circumscribed quadrilateral set on the basis of the attribute data of said attribute data generating/storing means and when a length of the extracted streak is not less than the second threshold.

* * * * *